(12) United States Patent
Morrison et al.

(10) Patent No.: US 10,344,111 B2
(45) Date of Patent: *Jul. 9, 2019

(54) PASSIVATED SUPPORTS: CATALYST, PROCESS, PRODUCT AND FILM

(71) Applicant: NOVA Chemicals (International) S.A., Fribourg (CH)

(72) Inventors: Darryl J Morrison, Calgary (CA); Patrick Lam, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/521,638

(22) PCT Filed: Nov. 12, 2015

(86) PCT No.: PCT/IB2015/058757
§ 371 (c)(1),
(2) Date: Apr. 25, 2017

(87) PCT Pub. No.: WO2016/079643
PCT Pub. Date: May 26, 2016

(65) Prior Publication Data
US 2017/0247485 A1    Aug. 31, 2017

(30) Foreign Application Priority Data
Nov. 19, 2014 (CA) .................................. 2871463

(51) Int. Cl.
| | | |
|---|---|---|
| *C08F 210/16* | (2006.01) | |
| *C08F 4/64* | (2006.01) | |
| *C08F 4/76* | (2006.01) | |
| *C08J 5/18* | (2006.01) | |
| *C08F 4/659* | (2006.01) | |

(52) U.S. Cl.
CPC .............. *C08F 210/16* (2013.01); *C08J 5/18* (2013.01); *C08F 4/65912* (2013.01); *C08F 4/65916* (2013.01); *C08F 2410/01* (2013.01); *C08F 2420/04* (2013.01); *C08J 2323/08* (2013.01)

(58) Field of Classification Search
CPC ............. C08F 210/16; C08F 4/64; C08F 4/76
See application file for complete search history.

(56) References Cited

U.S. PATENT DOCUMENTS

| | | |
|---|---|---|
| 3,248,179 A | 4/1966 | Norwood |
| 4,127,507 A | 11/1978 | Fannin et al. |
| 4,250,288 A | 2/1981 | Lowery, Jr. et al. |
| 4,325,849 A | 4/1982 | Rosen et al. |
| 4,482,687 A | 11/1984 | Noshay et al. |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,798,081 A | 1/1989 | Hazlitt et al. |
| 5,026,795 A | 6/1991 | Hogan |
| 5,028,670 A | 7/1991 | Chinh et al. |
| 5,206,075 A | 4/1993 | Hodgson, Jr. |
| 5,283,278 A | 2/1994 | Daire et al. |
| 5,317,036 A | 5/1994 | Brady, III et al. |
| 5,352,749 A | 10/1994 | DeChellis et al. |
| 5,376,439 A | 12/1994 | Hodgson et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,668,228 A | 9/1997 | Chinh et al. |
| 5,684,097 A | 11/1997 | Palmroos et al. |
| 5,965,677 A | 10/1999 | Stephan et al. |
| 6,022,935 A | 2/2000 | Fischer et al. |
| 6,031,056 A | 2/2000 | Friederichs et al. |
| 6,114,479 A | 9/2000 | Speca et al. |
| 6,124,230 A | 9/2000 | Speca et al. |
| 6,140,432 A | 10/2000 | Agapiou et al. |
| 6,300,435 B1 | 10/2001 | Gao et al. |
| 6,306,984 B1 | 10/2001 | Agapiou et al. |
| 6,391,819 B1 | 5/2002 | Agapiou et al. |
| 6,472,342 B2 | 10/2002 | Agapiou et al. |
| 6,562,924 B2 | 5/2003 | Benazouzz et al. |
| 6,608,153 B2 | 8/2003 | Agapiou et al. |
| 7,354,880 B2 | 4/2008 | Agapiou et al. |
| 7,476,715 B2 | 1/2009 | McKay et al. |
| 9,079,991 B2 * | 7/2015 | Ker ...................... C08F 210/16 |

(Continued)

FOREIGN PATENT DOCUMENTS

| | | |
|---|---|---|
| EP | 0 107 127 A1 | 5/1984 |
| EP | 0 811 638 A2 | 12/1997 |
| WO | 93/03093 A1 | 2/1993 |

OTHER PUBLICATIONS

Wild, L.; Ryle, T.R.; Knobelock, D. C. and Peat, I. R.; Determination of Branching Distributions in Polyethylene and Ethylene Copolymers; Copyright John Wiley & Sons, Inc. (1982); Journal of Polymer Science: Polymer Physics Edition, vol. 20, pp. 441-455.
Peri, J. B. and Hensley, A. L., Jr.; The Surface Structure of Silica Gel; The Journal of Physical Chemistry; vol. 72, No. 8, Aug. 1968, pp. 2926-2933.
Hieber, C. A. and Chiang, H. H.; Shear-Rate-Dependence Modeling of Polymer Melt Viscosity; Polymer Engineering and Science, Jul. 1992, vol. 32, No. 14; pp. 931-938.

(Continued)

*Primary Examiner* — Rip A Lee
(74) *Attorney, Agent, or Firm* — Julie L. Heinrich

(57) ABSTRACT

Ethylene copolymers made in the gas phase using a phosphinimine based single site catalyst supported on a passivated inorganic oxide support. The ethylene copolymers have a relatively narrow molecular weight distribution and good rheological parameters.

19 Claims, 9 Drawing Sheets

(56) References Cited

U.S. PATENT DOCUMENTS

| | | | |
|---|---|---|---|
| 9,096,745 B2* | 8/2015 | Lam | C08L 23/06 |
| 9,115,233 B2* | 8/2015 | Ker | B32B 27/22 |
| 9,815,925 B2* | 11/2017 | Lam | C08F 210/16 |
| 2011/0212315 A1 | 9/2011 | Fantinel et al. | |
| 2012/0316297 A1* | 12/2012 | Hoang | C08F 10/02 526/100 |
| 2013/0172500 A1* | 7/2013 | Morrison | C08F 210/16 526/172 |
| 2017/0226244 A1* | 8/2017 | Goyal | C08F 210/16 |
| 2017/0233512 A1* | 8/2017 | Goyal | C08F 210/16 525/240 |

OTHER PUBLICATIONS

Hieber, C.A. and Chiang, H. H.; Some correlations invoicing the shear viscosity of polyetyrene melts; Rheologica Acta 28vol. 28, No. 4 (1989); pp. 321-332.

Bird, R. B.; Armstrong, R. C. and Hasseger, O.; Dynamics of Polymer Liquids, Chapter 4: The Generalized Newtonian Fluid; vol. 1, Fluid Mechanics, 2nd Edition; copyright John Wiley & Sons (1987); pp. 169-175.

Pangborn, Amy B.; Giardello, Michael A.; Grubbs, Robert H.; Rosen, Robert K. and Timmers, Francis J.; Safe and Convenient Procedure for Solvent Purification; Organometallics (1996); Copyright American Chemical Society; vol. 15, No. 5; pp. 1518-1520.

Clark, James H. and MacQuarrie, Duncan J.; Catalysts, Supported; Kirk-Othmer Encyclopedia of Chemical Technology, Copyright John Wiley & Sons, Inc. (2001); Published online Nov. 15, 2002.; pp. 1-37.

Brunauer, Stephen; Emmett, P. H. and Teller, Edward; Adsorption of Gases in Multimolecular Layers; Journal of the American Chemical Society (1938); vol. 60.; pp. 309-319.

ASTM D5748-95 (Reapproved 2012)—Standard Test Method for Protrusion Puncture Resistance of Stretch Wrap Film; Copyright ASTM International; Current edition approved Apr. 1, 2012. Published May 2012. Originally approved in 1995. Last previous edition approved in 2007 as D5748-95 (2007).; pp. 1-4.

ASTM D 1895-96—Standard Test Methods for Apparent Density, Bulk Factor, and Pourability of Plastic Materials; Copyright ASTM International; Current edition approved Apr. 10, 1996. Published Jul. 1996. Originally published as D 1895-61. Last previous edition D 1895-89 (1990).; pp. 1-5.

ASTM D6474-99 (Reapproved 2006)—Standard Test Method for Determining Molecular Weight Distribution and Molecular Weight Averages of Polyolefins by High Temperature Gel Permeation chromatography; Copyright ASTM International; Current edition approved Mar. 15, 2006. Published Apr. 2006. Originally approved in 1999. Last previous edition approved in 1999 as D6474-99.; pp. 1-6.

ASTM D6645-01 (Reapproved 2010)—Standard Test Method for Methyl (Comonomer) Content in Polyethylene by Infrared Spectrophotometry; Copyright ASTM International; Current edition approved Jan. 1, 2010. Published Jan. 2010. Originally approved in 2001. Last previous edition approved in 2001 as D6645-01.; pp. 1-4.

ASTM D 2457-03—Standard Test Method for Specular Gloss of Plastic Films and Solid Plastics; Copyright ASTM International; Current edition approved Aug. 10, 2001 Published Oct. 2003. Originally approved in 1965. Last previous edition approved in 1997 as D 2457-97.; pp. 1-5.

ASTM D 1238-04—Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D 1238-01.; pp. 1-13.

ASTM D 1003-07—Standard Test Method for Haze and Luminous Transmittance of Transparent Plastics; Copyright ASTM International; Current edition approved Nov. 1, 2007. Published Nov. 2007. Originally approved in 1949. Last previous edition approved in 2000 as D 1003-00.; pp. 1-7.

ASTM D1709-09—Standard Test Methods for Impact Resistance of Plastic Film by the Free-Falling Dart Method; copyright ASTM International; Current edition approved May 1, 2009. Published Jun. 2009. Originally approved in 1959. Last previous edition approved in 2008 as D1709-08.; pp. 1-9.

ASTM D1922-09—Standard Test Method for Propagation Tear Resistance of Plastic Film and Thin Sheeting by Pendulum Method; Copyright ASTM International; Current edition approved May 1, 2009. Published Jun. 2009. Originally approved in 1961. Last previous edition approved in 2008 as D1922-08.; pp. 1-7.

ASTM F88/F88M-09—Standard Test Method for Seal Strength of Flexible Barrier Materials; Copyright ASTM International; Current edition approved Jun. 15, 2009. Published Jul. 2009. Originally approved in 1968. Last previous edition approved in 2007 as F88-07a.; pp. 1-6.

ASTM D882-10—Standard Test Method for Tensile Properties of Thin Plastic Sheeting; Copyright ASTM International; Current edition approved Apr. 1, 2010. Published Jun. 2010. Originally approved in 1946. Last previous edition approved in 2009 as D882-09.; pp. 1-10.

ASTM D7192-10—Standard Test Method for High Speed Puncture Properties of Plastic Films Using Load and Displacement Sensors; Copyright ASTM International; Current edition approved Apr. 1, 2010. Published May 2010. Originally approved in 2005. Last previous edition approved in 2008 as D7192-08a.; pp. 1-8.

ASTM D792-13—Standard Test Methods for Density and Specific Gravity (Relative Density) of Plastics by Displacement; Copyright ASTM International; Current edition approved Nov. 1, 2013. Published Nov. 2013. Originally approved in 1944. Last previous edition approved in 2008 as D792-08.; pp. 1-6.

ASTM D5227-13—Standard Test Method for Measurement of Hexane Extractable Content of Polyolefins; Copyright ASTM International; Current edition approved Jun. 1, 2013. Published Jul. 2013. Originally approved in 1992. Last previous edition approved in 2008 as D5227-01 (2008).; pp. 1-4.

* cited by examiner

GPC Profiles for Ethylene Copolymers 1-4 and Comp. Ethylene Copolymer 5

GPC-FTIR for Ethylene Copolymer 1.

GPC-FTIR for Ethylene Copolymer 2.

GPC-FTIR for Ethylene Copolymer 3.

GPC-FTIR for Ethylene Copolymer 4.

GPC-FTIR for Comp. Ethylene Copolymer 5

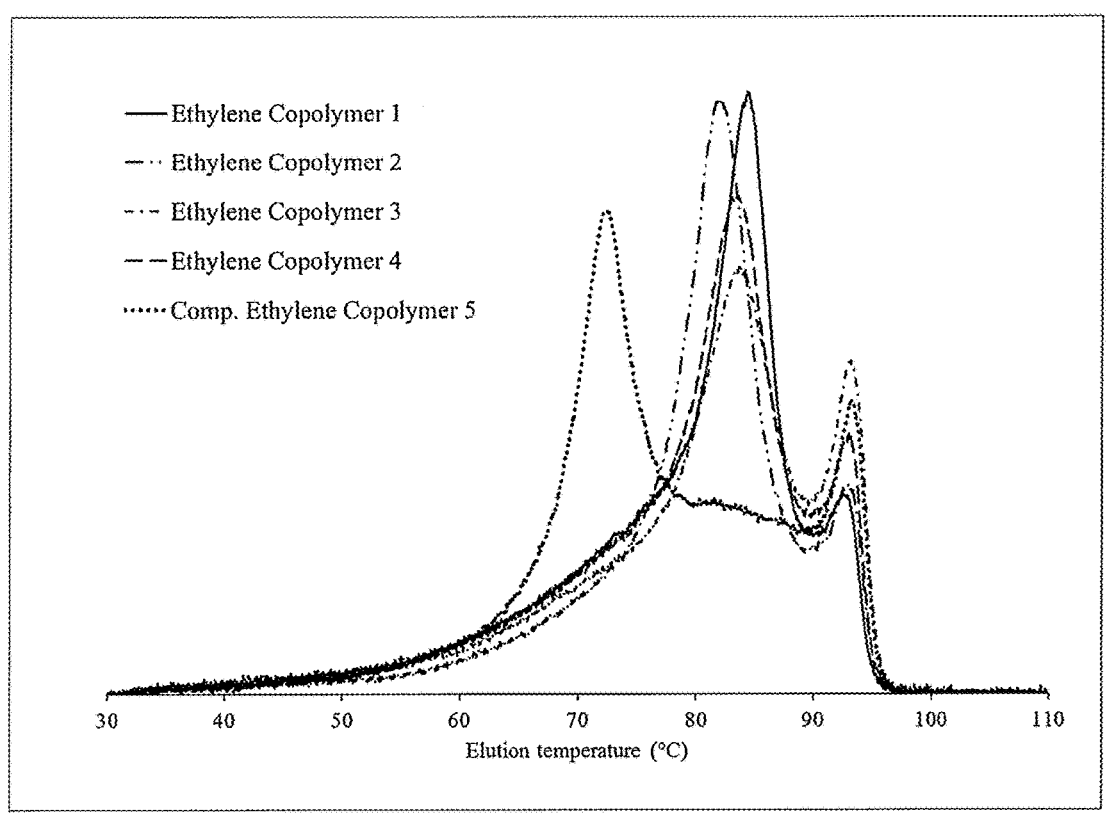
TREF Profiles for Ethylene Copolymers 1-4 and Comp. Ethylene Copolymer 5.

Phase Angle vs Complex Modulus (shaded) and Phase Angle vs Complex Viscosity (open) for Ethylene Copolymer 1 (squares) and Ethylene Copolymer 2 (triangles).

Phase Angle vs Complex Modulus (shaded) and Phase Angle vs Complex Viscosity (open) for Ethylene Copolymer 3 (squares) and Ethylene Copolymer 4 (triangles).

Phase Angle vs Complex Modulus (shaded) and Phase Angle vs Complex Viscosity (open) for Comp. Ethylene Copolymer 5 (squares) and Comp. Ethylene Copolymer 7 (triangles).

Van Gurp-Palmen (VGP) plots showing Phase Angle vs Complex Modulus for Ethylene Copolymers 1 (squares), 2 (stars), 3 (triangles), 4 (plus signs), Comp. Ethylene Copolymer 5 (circles) and Comp. Ethylene Copolymer 7 (diamonds)

PASSIVATED SUPPORTS: CATALYST, PROCESS, PRODUCT AND FILM

TECHNICAL FIELD

The present invention is directed to the preparation of ethylene copolymers using a phosphinimine based single site catalyst supported on a passivated inorganic oxide support. The passivated support is formed by adding an organoaluminum compound, and then magnesium chloride to, for example, silica.

BACKGROUND ART

Ethylene copolymers having good processability and good physical properties are often made by way of blending two polyethylene compositions together where one resin imparts a desirable level of processability and one resin imparts good physical properties, such as good dart impact or tear resistance properties when the blend is blown into film. In an effort to avoid the need for polymer blending, dual or mixed catalysts strategies have also been developed for use in polymerization reactors. In other cases ethylene copolymers having balanced processability and physical properties have been made using a single catalyst in a single reactor. See, for example, U.S. Pat. Appl. Pub. No. 2014/0100343 which describes the formation of a polyethylene resin made using a phosphinimine catalyst supported on silica.

In addition to standard inert supports such as, for example, silica, single site catalysts have also been supported on so called "passivated support" materials as is described in U.S. Pat. Appl. Pub. No. 2013/0172500.

DISCLOSURE OF THE INVENTION

We now report that well balanced ethylene copolymer compositions are available by carrying out ethylene polymerization with a phosphinimine catalyst which is immobilized on a passivated silica support.

Provided is an olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index CDBI$_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride.

Provided is an olefin polymerization process to produce an ethylene copolymer, the process comprising contacting ethylene and at least one alpha olefin having from 3-8 carbon atoms with a polymerization catalyst in a single gas phase reactor; the ethylene copolymer having a density of from 0.916 g/cm$^3$ to 0.936 g/cm$^3$, and a melt flow ratio ($I_{21}/I_2$) of greater than 22 but less than 42; wherein the polymerization catalyst comprises a phosphinimine catalyst, a passivated support, and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; and wherein the phosphinimine catalyst has the formula: (1-R$^\text{Y}$-Indenyl)((t-Bu)$_3$P=N)TiX$_2$, where R$^\text{Y}$ is an alkyl group, an aryl group or a benzyl group and wherein each of the alkyl group, the aryl group, and the benzyl group is unsubstituted or is substituted by at least one fluoride atom; and X is an activatable ligand.

Provided is an ethylene copolymer having a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 40, a molecular weight distribution ($M_w/M_n$) of from 2.5 to 4.0, a z-average molecular weight distribution of less than 3.0, a reverse comonomer distribution profile as determined by GPC-FTIR, and a composition distribution breadth index CDBI$_{50}$ of from 50 wt % to 80 wt % as determined by TREF, and a bimodal TREF profile; wherein the ethylene copolymer is made in a single gas phase reactor using a polymerization catalyst comprising: a phosphinimine catalyst, a passivated support and a co-catalyst; wherein the passivated support comprises silica which has been treated with i) an organoaluminum compound and ii) magnesium chloride; and wherein the magnesium chloride is generated by addition of a diorganomagnesium compound and a source of chloride to the organoaluminum treated silica, provided that the source of chloride is not a transition metal chloride.

Provided is a film layer comprising an ethylene copolymer having a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 40, a molecular weight distribution ($M_w/M_n$) of from 2.5 to 4.5, a z-average molecular weight distribution ($M_z/M_w$) of less than 3.0, a reverse comonomer distribution profile as determined by GPC-FTIR, and a composition distribution breadth index CDBI$_{50}$ of from 50 wt % to 80 wt % as determined by TREF, and a bimodal TREF profile; wherein the ethylene copolymer is made in a single gas phase reactor using a polymerization catalyst comprising: a phosphinimine catalyst, a passivated support and a co-catalyst; wherein the passivated support comprises silica which has been treated with i) an organoaluminum compound and ii) magnesium chloride; and wherein the magnesium chloride is generated by addition of a diorganomagnesium compound and a source of chloride to the organoaluminum treated silica, provided that the source of chloride is not a transition metal chloride.

BRIEF DESCRIPTION OF DRAWINGS

FIG. 3 shows temperature rising elution fractionation (TREF) analyses and profiles of ethylene copolymers made according to the present invention as well as a comparative ethylene copolymer.

BEST MODE FOR CARRYING OUT THE INVENTION

Figure 1:
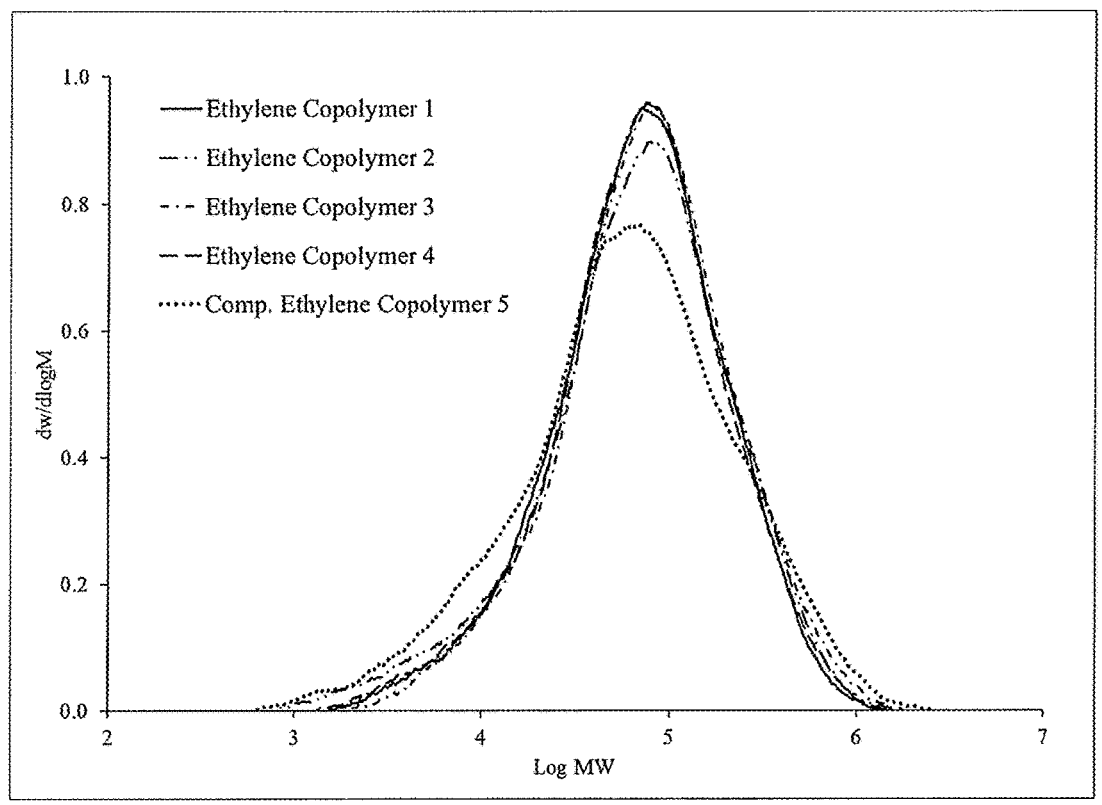
FIG. 1 shows a gel permeation chromatograph (GPC) with refractive index detection, of ethylene copolymers made according to the present invention as well as a comparative ethylene copolymer.

The present invention is directed to a method for making a passivated inorganic oxide support, and to polymerization catalysts, polymerization processes and polymerization products which arise when employing such a support.

In the present invention, the term "polar solvent" or "donor solvent" is meant to connote a solvent having one or more heteroatoms with available electron density. Heteroatoms may be selected from for example, O, N, S, P atoms. Exemplary polar or donor solvents include, for example, water, alcohols, dialkylethers, and tetrahydrofuran (THF).

In the present invention, the term "protic solvent" connotes a solvent having reactive or dissociable $H^+$ (proton). Exemplary protic solvents include, for example, water, alcohols and amines which have a hydrogen bound to an oxygen or a nitrogen atom. The term "aprotic solvent" then means a solvent not having a dissociable or reaction $H^+$ (proton).

In the present invention, a polymerization catalyst will minimally comprise a passivated support, a phosphinimine catalyst, and a co-catalyst.

In an embodiment of the invention, a polymerization catalyst will comprise a single transition metal catalyst, a passivated support, a catalyst activator, and optionally a catalyst modifier; wherein the single transition metal catalyst is a phosphinimine catalyst.

The Passivated Support

The passivated support is based on an inorganic oxide material.

Inorganic oxides include Group 2, 3, 4, 5, 13 and 14 metal oxides generally, silica, alumina, silica-alumina, magnesium oxide, zirconia, titania, clay (e.g. montmorillonite) and mixtures thereof. Agglomerate supports such as agglomerates of silica and clay may also be used as a support in the current invention.

In embodiment of the invention, silica is preferred for use as the inorganic oxide.

Supports are generally used in calcined form. An inorganic oxide support, for example silica, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the invention, the support is calcined at temperatures above 200° C., or above 300° C., or above, 400° C., or above 500° C. In other embodiments, the support is calcined at from about 500° C. to about 1000° C., or from about 600° C. to about 900° C. In embodiments of the invention, the resulting support may be free of adsorbed water and may have a surface hydroxyl content from about 0.1 to 5 mmol/g of support, or from 0.5 to 3 mmol/g. The amount of hydroxyl groups present in a silica support may be determined according to the method disclosed by J. B. Peri and A. L. Hensley Jr., in *J. Phys. Chem.*, 72 (8), 1968, pg. 2926.

A support material, such as silica, typically has a surface area of from about 10 to about 900 $m^2/g$, a pore volume in the range from about 0.1 to about 4.0 cm³/g and an average particle size of from about 5 to about 500 μm. In a specific embodiment, the support material has a surface area of from about 50 to about 500 m²/g, a pore volume in the range from about 0.5 to about 3.5 cm³/g and an average particle size of from about 10 to about 200 μm. In another specific embodiment the support material has a surface area of from about 100 to about 400 m²/g, a pore volume in the range from about 0.8 to about 3.0 cm³/g and an average particle size of from about 5 to about 100 μm.

A support material, such as silica, typically has an average pore size (i.e. pore diameter) of from about 10 to about 1000 Angstroms (Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society,* 1938, v 60, pg. 309-319.

A silica support which is suitable for use in the present invention has a high surface area and is amorphous. By way of example, useful silicas are commercially available under the trademark of Sylopol® 958, 955 and 2408 from Davison Catalysts, a Division of W. R. Grace and Company and ES-70W from PQ Corporation.

A "passivated support" in the present invention is an inorganic oxide which has been treated with an organoaluminum compound and magnesium halide.

To make a passivated support, the inorganic oxide is treated first with an organoaluminum compound and next with a magnesium halide. In an embodiment of the invention, the magnesium halide is preferably magnesium chloride (MgCl₂). In the present invention, the magnesium halide must be generated in situ by combining a diorganomagnesium compound with a source of halide. Generation of magnesium chloride in situ, for example, makes the use of polar or donor solvents, usually required to dissolve MgCl₂, unnecessary. Without wishing to be bound by theory, the result of such treatments is a passivated inorganic oxide support which has on its surface, and mainly distributed within its pores, a magnesium halide compound, network or matrix. Although not preferred, the use of a Grignard reagent in place of a diorganomagnesium reagent is also contemplated by the invention, so long as the Grignard reagent selected is at least partially soluble in a hydrocarbon solvent lacking donor or polar groups.

In an embodiment of the invention the passivated support is formed by carrying out the following steps in sequence:
i) dehydrating an inorganic oxide under calcinations conditions;
ii) treating the calcined inorganic oxide with an organoaluminum compound;
iii) reacting the product of step ii) with a diorganomagnesium compound; and
iv) adding a source of halide (e.g. chloride) to the product of step iii).

In an embodiment of the invention the passivated support is formed by carrying out the following steps in sequence:
i) dehydrating an inorganic oxide under calcinations conditions;
ii) treating the calcined inorganic oxide with an organoaluminum compound;
iii) adding a source of halide (e.g. chloride) to the product of step ii); and
iv) reacting the product of step iii) with a diorganomagnesium compound.

In an embodiment of the invention, steps ii), iii) and iv) are carried out in a non-polar hydrocarbon solvent or diluent.

The organoaluminum compound added to the inorganic oxide may be selected from organoaluminum compounds having the formula:

$$Al^4(X^5)_n(X^6)_{3-n},$$

where $(X^5)$ is a hydrocarbyl having from 1 to about 20 carbon atoms; $(X^6)$ is selected from alkoxide or aryloxide, any one of which having from 1 to about 20 carbon atoms; halide; or hydride; and n is a number from 1 to 3, inclusive. The organoaluminum compound may also be a di- or multi aluminum species bridged by a heteroatom, preferably an oxygen atom. Although not preferred, the use of an alkylaluminoxane reagent as the organoaluminum compound is also contemplated by the current invention.

Some non-limiting examples of organoaluminum compounds which can be used in the present invention include but are not limited to trimethylaluminum, triisobutylaluminum, triethylaluminum, tri-n-hexylaluminum, tri-n-octylaluminum, dimethylaluminum chloride, methyl aluminum dichloride, diethylaluminum chloride, ethylaluminum dichloride, diethylaluminum ethoxide, and bis(di-isobutylaluminum)oxide.

The amount of organoaluminum compound added to an inorganic oxide (e.g. calcined silica) will depend on a number of factors such as but not limited to the type of inorganic oxide and the calcination conditions used prior to treatment. In an embodiment of the invention, the amount of organoaluminum compound added to a calcined inorganic oxide can be from about 0.025 mmol to about 4.0 mmol per gram of inorganic oxide. In further embodiments of the invention, the amount of organoaluminum compound added to a calcined inorganic oxide will be from about 0.025 mmol to about 3.5 mmol per gram of inorganic oxide, or from about 0.05 mmol to about 4.0 mmol per gram of inorganic oxide, or from about 0.05 mmol to about 3.0 mmol per gram of inorganic oxide, or from about 0.05 mmol to about 2.5 mmol per gram of inorganic oxide, or from about 0.1 mmol to about 4.0 mmol per gram of inorganic oxide, or from about 0.1 mmol to about 3.5 mmol per gram of inorganic oxide, or from about 0.1 mmol to about 3.0 mmol per gram of inorganic oxide, or from about 0.1 mmol to about 2.5 mmol per gram of inorganic oxide, or from about 0.25 mmol to about 3.0 mmol per gram of inorganic oxide, or from about 0.25 mmol to about 2.5 mmol per gram of inorganic oxide.

In an embodiment of the invention, it is preferred that an organoaluminum compound be added to a support in the absence of relatively polar solvents or solvents having a donor atom. Hence, suitable diluent(s) or solvent(s) are typically inert hydrocarbons. Suitable, non-limiting diluents or solvents may be selected from the following inert hydrocarbons: n-butane, n-pentane, isopentane, n-hexane, various isomeric hexanes, heptane, n-octane, isooctane, paraffinic mixtures of alkanes having from 8 to 12 carbon atoms, cyclohexane, methylcyclohexane, dimethylcyclohexane, dodecane, industrial solvents composed of saturated or aromatic hydrocarbons such as kerosene, naphthas, benzene, toluene and the like, and mixtures thereof.

The diorganomagnesium compound may be a dihydrocarbylmagnesium such as dialkylmagnesium or diarylmagnesium. In an embodiment of the invention, dialkylmagnesium compounds are preferred. In an embodiment of the invention, a diorganomagnesium compound has the general formula MgR$^a$R$^b$ where R$^a$ and R$^b$ are each independently selected from C$_1$ to C$_{20}$ hydrocarbyl groups. In another embodiment of the invention, a diorganomagnesium compound has the general formula MgR$^a$R$^b$ where R$^a$ and R$^b$ are each independently selected from C$_1$ to C$_8$ hydrocarbyl groups.

Suitable non-limiting dialkylmagnesium compounds include dibutylmagnesium (e.g. di-n-butylmagnesium), diisopropylmagnesium, dihexylmagnesium (e.g. di-n-hexylmagnesium), diethylmagnesium, propylbutylmagnesium (e.g. di-n-propyl-n-butylmagnesium), butylethylmagnesium (e.g. n-butyl-ethylmagnesium), butyloctylmagnesium (e.g. n-butyl-n-octylmagnesium) and other compounds having the general formula MgR$^a$R$^b$ where R$^a$ and R$^b$ are each independently selected from C$_1$ to C$_8$ linear or branched alkyl groups.

Suitable diarylmagnesium compounds also include diphenylmagnesium, and ditolylmagnesium.

Diorganomagnesium compounds having alkylaryl groups are also contemplated for use with the current invention and include for example dibenzylmagnesium.

In cases where the diorganomagnesium compound is not readily soluble in the solvents or diluents of choice for the passivated support preparation, it may be desirable to add a solubilizing compound such as an organoaluminum or organozinc compound prior to use. Such compounds are discussed in, for example, U.S. Pat. Nos. 4,127,507 and 4,250,288. Alternatively, where diorganomagnesium compounds provide solutions which are overly viscous in diluents of choice, solubilizers such as organoaluminum or organozinc may be used to decrease the viscosity of the solution.

The diorganomagnesium compounds used in the present invention may be treated with a solubilizing agent (or viscosity improving agent) and may be formulated as solutions in a suitable hydrocarbon solvent. Such solutions are commercially available from suppliers such as Albemarle, Akzo Nobel, etc. For example, diorganomagnesium compounds available in hydrocarbon solution include solutions of butylethylmagnesium or dibutylmagnesium which have been treated with an organoaluminum compound to improve solubility and/or reduce solution viscosity.

In an embodiment of the present invention, it is preferable that the diorganomagnesium compounds be added to a support in the absence of relatively polar solvents or solvents having a donor atom. Hence, suitable diluent(s) or solvent(s) are typically inert hydrocarbons. Suitable, non-limiting diluents or solvents may be selected from the following inert hydrocarbons: n-butane, n-pentane, isopentane, n-hexane, various isomeric hexanes, heptane, n-octane, isooctane, paraffinic mixtures of alkanes having from 8 to 12 carbon atoms, cyclohexane, methylcyclohexane, di methylcyclohexane, dodecane, industrial solvents composed of saturated or aromatic hydrocarbons such as kerosene, naphthas, benzene, toluene and the like, and mixtures thereof.

In an embodiment of the invention, the amount diorganomagnesium compound added to an inorganic oxide can be from 0.025 mmol to 5 mmol per gram of inorganic oxide. In further embodiments of the invention, the amount diorganomagnesium compound added to an inorganic oxide can be from 0.025 mmol to 3.5 mmol per gram of inorganic oxide, or from 0.05 to 3.5 mmol per gram of inorganic oxide, or from 0.1 to 3.5 mmol per gram of inorganic oxide, or from 0.25 to 3.5 mmol per gram of inorganic oxide, or from 0.5 to 3.5 mmol per gram of inorganic oxide, or from 0.5 to 3.0 mmol per gram of inorganic oxide, or from 0.5 to 2.5 mmol per gram of inorganic oxide.

The source of halide (e.g. chloride) ion is not specifically defined and can be any suitable halide source compound, which is capable of providing an active (i.e. reactive) halide ion for reaction with a diorganomagnesium bond. In an embodiment of the invention, the halide source is capable of providing a chloride ion for reaction with a diorganomagnesium bond. In an embodiment of the invention it is preferable that the halide source react spontaneously and fully with the diorganomagnesium compound, but a halide source, such as for example a chloride source, which requires a transfer agent to facilitate halide transfer such as described in U.S. Pat. No. 6,031,056 is also contemplated for use with the current invention.

In an embodiment of the invention, the source of halide will be a non-transition metal source of halide, preferably a non-transition metal chloride compound. In an embodiment of the invention, convenient chloride sources include, for example, HCl or tert-butyl chloride.

In an embodiment of the invention, the source of halide will be an organic halide compound such as, for example, an alkyl chloride having the formula (R$^c$)Cl, wherein R$^c$ is a C$_1$ to C$_8$ alkyl group.

In an embodiment of the present invention, the source of halide (e.g. chloride) will be added to a support in the absence of relatively polar solvents or solvents having a donor atom. Hence, suitable diluent(s) or solvent(s) are typically inert hydrocarbons. Suitable, non-limiting diluents or solvents may be selected from the following inert hydrocarbons: n-butane, n-pentane, isopentane, n-hexane, various isomeric hexanes, heptane, n-octane, isooctane, paraffinic mixtures of alkanes having from 8 to 12 carbon atoms, cyclohexane, methylcyclohexane, dimethylcyclohexane, dodecane, industrial solvents composed of saturated or aromatic hydrocarbons such as kerosene, naphthas, benzene, toluene and the like, and mixtures thereof.

The amount of the source of halide which is added to the inorganic oxide should be sufficient to convert a majority of the diorganomagnesium compound into magnesium halide. For example, the molar ratio of halide in the source of halide to a diorganomagnesium compound MgR$^a$R$^b$ should be at least 1.5. In another embodiment, the molar ratio of halide in the source of halide to the diorganomagnesium compound is at least 1.75. In another embodiment, the molar ratio of halide in the source of halide to the diorganomagnesium compound is at least 1.85. In another embodiment, the molar ratio of halide in the source of halide to the diorganomagnesium compound is at least 1.95.

In further embodiments of the invention the molar ratio of chloride in a source of chloride to a diorganomagnesium compound MgR$^a$R$^b$ is from 1.5 to 3.0, or from 1.75 to 2.75, or from 1.85 to 2.5, or from 2.0 to 3.0, or from 2.0 to 2.5, or from 1.95 to 2.5, or from 1.95 to 2.25.

In an embodiment of the invention, the passivated support is prepared in a non-polar hydrocarbon solvent or diluent.

In an embodiment of the invention, the finished olefin polymerization catalyst, comprising a passivated support, a phosphinimine catalyst and a co-catalyst, can have from about 1 to about 20 weight percent (wt %) of magnesium chloride present based on the total weight of the catalyst. In an embodiment of the invention, the finished olefin polymerization catalyst, comprising a passivated support, a phosphinimine catalyst and a co-catalyst, can have from about 1 to about 15 weight percent (wt %) of magnesium chloride present based on the total weight of the catalyst. In an embodiment of the invention, the finished olefin polymerization catalyst, comprising a passivated support, a phosphinimine catalyst and a co-catalyst, can have from about 1 to about 15 weight percent (wt %) of magnesium chloride present based on the total weight of the catalyst. In an embodiment of the invention, the finished olefin polymerization catalyst, comprising a passivated support, a phosphinimine catalyst and a co-catalyst, can have from about 1 to about 13 weight percent (wt %) of magnesium chloride present based on the total weight of the catalyst. In an embodiment of the invention, the finished olefin polymerization catalyst, comprising a passivated support, a phosphinimine catalyst and a co-catalyst, can have from about 1 to about 10 weight percent (wt %) of magnesium chloride present based on the total weight of the catalyst. In an embodiment of the invention, the finished olefin polymerization catalyst, comprising a passivated support, a phosphinimine catalyst and a co-catalyst, can have from about 1 to about 7.5 weight percent (wt %) of magnesium chloride present based on the total weight of the catalyst.

The Phosphinimine Catalyst

Preferably, the phosphinimine catalyst is based on metals from group 4, which includes titanium, hafnium and zirconium. The most preferred phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

In an embodiment of the invention, a phosphinimine catalyst is defined by the formula: $(L)_n(Pl)_mMX_p$ where M is a transition metal selected from Ti, Hf, Zr; Pl is a phosphinimine ligand; L is a cyclopentadienyl-type ligand; X is an activatable ligand; m is 1 or 2; n is 0 or 1; and p is determined by the valency of the metal M. Preferably m is 1, n is 1 and p is 2.

In an embodiment of the invention, a phosphinimine catalyst is defined by the formula: $(L)(Pl)MX_2$ where M is a transition metal selected from Ti, Hf, Zr; Pl is a phosphinimine ligand; L is a cyclopentadienyl-type ligand; and X is an activatable ligand.

The phosphinimine ligand is defined by the formula: $R_3P=N-$, where N bonds to the metal, and wherein each R is independently selected from the group consisting of a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $-SiR'_3$ wherein each R' is independently selected from the group consisting of hydrogen, a $C_{1-8}$ alkyl or alkoxy radical, $C_{6-10}$ aryl or aryloxy radicals; and germanyl radical of the formula: $-GeR'_3$ wherein R' is as defined above.

In an embodiment of the invention the phosphinimine ligand is chosen so that each R is a hydrocarbyl radical. In a particular embodiment of the invention, the phosphinimine ligand is tri-(tert-butyl)phosphinimine (i.e. where each R is a tertiary butyl group).

In an embodiment of the invention, the phosphinimine catalyst is a group 4 compound/complex which contains one phosphinimine ligand (as described above) and one ligand L which is a cyclopentadienyl-type ligand.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current invention, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as $-CH_2C_6F_5$); a halogen atom; a $C_{1-8}$ alkoxy radical; a $C_{6-10}$ aryl or aryloxy radical (each of which may be further substituted by for example a halide and/or a hydrocarbyl group; for example a suitable $C_{6-10}$ aryl group is a perfluoroaryl group such as $-C_6F_5$); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $-Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula $-Ge(R')_3$ wherein R' is as defined directly above.

The term "activatable ligand" refers to a ligand which may be activated by a co-catalyst (also referred to as an "activator"), to facilitate olefin polymerization. An activatable ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins. In embodiments of the present invention, the activatable ligand, X is independently selected from the group consisting of a hydrogen atom; a halogen atom; a $C_{1-10}$ hydrocarbyl radical; a $C_{1-10}$ alkoxy radical; a $C_{6-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable X ligands may also be joined to one another and form for example, a substituted or unsubstituted diene ligand (i.e. 1,3-diene); or a delocalized heteroatom containing group such as an acetate group.

The number of activatable ligands depends upon the valency of the metal and the valency of the activatable ligand. The preferred phosphinimine catalysts are based on group 4 metals in their highest oxidation state (i.e. $4^+$). Particularly suitable activatable ligands are monoanionic such as a halide (e.g. chloride) or a hydrocarbyl (e.g. methyl, benzyl).

In some instances, the metal of the phosphinimine catalyst may not be in the highest oxidation state. For example, a titanium (III) component would contain only one activatable ligand.

In an embodiment of the invention, the phosphinimine catalyst has the formula, (L)(Pl)MX$_2$, where M is Ti, Zr or Hf; Pl is a phosphinimine ligand having the formula R$_3$P=N—, where R is independently selected from the group consisting of hydrogen, halogen, and C$_1$-C$_{20}$ hydrocarbyl; L is a ligand selected from the group consisting of cyclopentadienyl, substituted cyclopentadienyl, indenyl, substituted indenyl, fluorenyl, and substituted fluorenyl; and X is an activatable ligand.

In an embodiment of the invention, the phosphinimine catalyst has the formula: (L)((t-Bu)$_3$P=N)TiX$_2$, where L is a ligand selected from the group consisting of cyclopentadienyl, substituted cyclopentadienyl, indenyl, and substituted indenyl; and X is an activatable ligand.

In an embodiment of the invention, the phosphinimine catalyst has the formula: (L)((t-Bu)$_3$P=N)TiX$_2$, where L is a ligand selected from the group consisting of a substituted cyclopentadienyl and substituted indenyl; and X is an activatable ligand.

In an embodiment of the invention, the phosphinimine catalyst contains a phosphinimine ligand, a cyclopentadienyl ligand ("Cp" for short) and two chloride or two methyl ligands bonded to the group 4 metal.

In an embodiment of the invention, the phosphinimine catalyst contains a phosphinimine ligand, a substituted cyclopentadienyl ligand and two chloride or two methyl ligands bonded to the group 4 metal.

In an embodiment of the invention, the phosphinimine catalyst contains a phosphinimine ligand, a perfluoroaryl substituted cyclopentadienyl ligand and two chloride or two methyl ligands bonded to the group 4 metal.

In an embodiment of the invention, the phosphinimine catalyst contains a phosphinimine ligand, a perfluorophenyl substituted cyclopentadienyl ligand (i.e. Cp-C$_6$F$_5$) and two chloride or two methyl ligands bonded to the group 4 metal.

In an embodiment of the invention, the phosphinimine catalyst contains a 1,2-substituted cyclopentadienyl ligand and a phosphinimine ligand which is substituted by three tertiary butyl substituents.

In an embodiment of the invention, the phosphinimine catalyst contains a 1,2 substituted cyclopentadienyl ligand (e.g. a 1,2-(R*)(Ar—F)Cp) where the substituents are selected from R* a hydrocarbyl group, and Ar—F a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group respectively.

In the present invention, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current invention contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the invention, the phosphinimine catalyst has the formula: (1,2-(R*)(Ar—F)Cp)M(N=P(t-Bu)$_3$)X$_2$ where R* is a hydrocarbyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(R*)(Ar—F)Cp)M(N=P(t-Bu)$_3$)X$_2$ where R* is an alkyl group; Ar—F is a perfluorinated aryl group, a 2,6 (i.e. ortho) fluoro substituted phenyl group, a 2,4,6 (i.e. ortho/para) fluoro substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(R*)(Ar—F)Cp)M(N=P(t-Bu)$_3$)X$_2$ where R* is a hydrocarbyl group having from 1 to 20 carbons; Ar—F is a perfluorinated aryl group; M is Ti, Zr or Hf; and X is an activatable ligand. In an embodiment of the invention, the phosphinimine catalyst has the formula: (1,2-(R*)(Ar—F)Cp)M(N=P(t-Bu)$_3$)X$_2$ where R* is a straight chain alkyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(n-R*)(Ar—F)Cp)Ti(N=P(t-Bu)$_3$)X$_2$ where R* is a straight chain alkyl group; Ar—F is a perfluorinated aryl group; M is Ti, Zr or Hf; and X is an activatable ligand. In an embodiment of the invention, the phosphinimine catalyst has the formula: (1,2-(R*)(C$_6$F$_5$)Cp)M(N=P(t-Bu)$_3$)X$_2$ where R* is a hydrocarbyl group having 1 to 20 carbon atoms; M is Ti, Zr or Hf; and X is an activatable ligand. In an embodiment of the invention, the phosphinimine catalyst has the formula: (1,2-(n-R*)(C$_6$F$_5$)Cp)M(N=P(t-Bu)$_3$)X$_2$ where R* is a straight chain alkyl group; M is Ti, Zr or Hf; and X is an activatable ligand. In further embodiments, M is Ti and R* is selected from the group consisting of n-propyl, n-butyl and n-hexyl, and X is selected from chloride or methide. In further embodiments, M is Ti and R* is any one of a methyl, ethyl, n-propyl, n-butyl, n-pentyl, n-hexyl, n-heptyl, and n-octyl group. In further embodiments, X is chloride or methide.

The term "perfluorinated aryl group" means that each hydrogen atom attached to a carbon atom in an aryl group has been replaced with a fluorine atom as is well understood in the art (e.g. a perfluorinated phenyl group or substituent has the formula —C$_6$F$_5$). In embodiments of the invention, Ar—F is selected from the group comprising perfluorinated phenyl or perfluorinated naphthyl groups.

Some phosphinimine catalysts which may be used in the present invention include: ((C$_6$F$_5$)Cp)Ti(N=P(t-Bu)$_3$)Cl$_2$; (1,2-(n-propyl)(C$_6$F$_5$)Cp)Ti(N=P(t-Bu)$_3$)Cl$_2$, (1,2-(n-butyl)(C$_6$F$_5$)Cp)Ti(N=P(t-Bu)$_3$)Cl$_2$ and (1,2-(n-hexyl)(C$_6$F$_5$)Cp)Ti(N=P(t-Bu)$_3$)Cl$_2$.

In an embodiment of the invention, the phosphinimine catalyst will have a single or multiply substituted indenyl ligand and a phosphinimine ligand which is substituted by three tertiary butyl substituents.

An indenyl ligand (or "Ind" for short) as defined in the present invention will have framework carbon atoms with the numbering scheme provided below, so the location of a substituent can be readily identified.

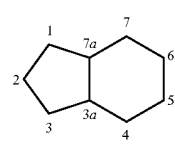

In an embodiment of the invention, the phosphinimine catalyst will have a singly substituted indenyl ligand and a phosphinimine ligand which is substituted by three tertiary butyl substituents.

In an embodiment of the invention, the phosphinimine catalyst will have a singly or multiply substituted indenyl ligand where the substituent is selected from the group consisting of a substituted or unsubstituted alkyl group, a substituted or an unsubstituted aryl group, and a substituted or unsubstituted benzyl (e.g. $C_6H_5CH_2$—) group. Suitable substituents for the alkyl, aryl or benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, $R^¥$-Indenyl, where the $R^¥$ substituent is a substituted or unsubstituted alkyl group, a substituted or an unsubstituted aryl group, or a substituted or unsubstituted benzyl group. Suitable substituents for an $R^¥$ alkyl, $R^¥$ aryl or $R^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have an indenyl ligand having at least a 1-position substituent (1-$R^¥$) where the substituent $R^¥$ is a substituted or unsubstituted alkyl group, a substituted or an unsubstituted aryl group, or a substituted or unsubstituted benzyl group. Suitable substituents for an $R^¥$ alkyl, $R^¥$ aryl or $R^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^¥$-Indenyl where the substituent $R^¥$ is in the 1-position of the indenyl ligand and is a substituted or unsubstituted alkyl group, a substituted or unsubstituted aryl group, or a substituted or an unsubstituted benzyl group. Suitable substituents for an $R^¥$ alkyl, $R^¥$ aryl or $R^¥$ benzyl group may be selected from the group consisting of alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^¥$-Indenyl, where the substituent $R^¥$ is a (partially/fully) halide substituted alkyl group, a (partially/fully) halide substituted benzyl group, or a (partially/fully) halide substituted aryl group.

In an embodiment of the invention, the phosphinimine catalyst will have a singly substituted indenyl ligand, 1-$R^¥$-Indenyl, where the substituent $R^¥$ is a (partially/fully) halide substituted benzyl group.

When present on an indenyl ligand, a benzyl group can be partially or fully substituted by halide atoms, preferably fluoride atoms. The aryl group of the benzyl group may be a perfluorinated aryl group, a 2,6 (i.e. ortho) fluoro substituted phenyl group, 2,4,6 (i.e. ortho/para) fluoro substituted phenyl group or a 2,3,5,6 (i.e. ortho/meta) fluoro substituted phenyl group respectively. The benzyl group is, in an embodiment of the invention, located at the 1 position of the indenyl ligand.

In an embodiment of the invention, the phosphinimine catalyst will have a singly substituted indenyl ligand, 1-$R^¥$-Indenyl, where the substituent $R^¥$ is a pentafluorobenzyl ($C_6F_5CH_2$—) group.

In an embodiment of the invention, the phosphinimine catalyst has the formula: (1-$R^¥$-(Ind))M(N=P(t-Bu)$_3$)X$_2$ where $R^¥$ is a substituted or unsubstituted alkyl group, a substituted or an unsubstituted aryl group, or a substituted or unsubstituted benzyl group, wherein substituents for the alkyl, aryl or benzyl group are selected from the group consisting of alkyl, aryl, alkoxy, aryloxy, alkylaryl, arylalkyl and halide substituents; M is Ti, Zr or Hf; and X is an activatable ligand.

In an embodiment of the invention, the phosphinimine catalyst has the formula: (1-$R^¥$-(Ind))M(N=P(t-Bu)$_3$)X$_2$ where $R^¥$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the invention, the phosphinimine catalyst has the formula: (1-$R^¥$-(Ind))M(N=P(t-Bu)$_3$)X$_2$ where $R^¥$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the invention, the phosphinimine catalyst has the formula: (1-$R^¥$-(Ind))Ti(N=P(t-Bu)$_3$)X$_2$ where $R^¥$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the invention, the phosphinimine catalyst has the formula: (1-$C_6F_5CH_2$-Ind)M(N=P(t-Bu)$_3$)X$_2$, where M is Ti, Zr or Hf; and X is an activatable ligand.

In an embodiment of the invention, the phosphinimine catalyst has the formula: (1-$C_6F_5CH_2$-Ind)Ti(N=P(t-Bu)$_3$)X$_2$, where X is an activatable ligand.

In an embodiment of the invention, the phosphinimine catalyst has the formula: (1-$C_6F_5CH_2$-Ind)Ti(N=P(t-Bu)$_3$)Cl$_2$.

The Co-Catalyst

In the present invention, the phosphinimine catalyst is used in combination with at least one activator (or "co-catalyst") to form an active polymerization catalyst system for olefin polymerization. Activators (i.e. co-catalysts) include ionic activator co-catalysts and hydrocarbyl aluminoxane co-catalysts.

The activator used to activate the phosphinimine catalyst can be any suitable activator including one or more activators selected from the group consisting of alkylaluminoxanes and ionic activators, optionally together with an alkylating agent.

The alkylaluminoxanes are complex aluminum compounds of the formula: $R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

The alkylaluminoxanes are typically used in substantial molar excess compared to the amount of group 4 transition metal in the phosphinimine catalyst. The $Al^1$:group 4 transition metal molar ratios are from 10:1 to 10,000:1, preferably about 30:1 to 500:1.

In an embodiment of the invention, the catalyst activator is methylaluminoxane (MAO).

In an embodiment of the invention, the catalyst activator is modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the activator of the present invention may be a combination of an alkylating agent (which may also serve as a scavenger) with an activator capable of ionizing the group 4 metal of the phosphinimine catalyst (i.e. an ionic activator). In this context, the activator can be chosen from one or more alkylaluminoxane and/or an ionic activator.

When present, the alkylating agent may be selected from the group consisting of $(R^4)_p MgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_q ZnX^2_{2-q}$ wherein $R^4$ is as defined above, $X^2$ is halogen and q is 1 or 2; $(R^4)_s Al^2 X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium ((Bu)$_2$Mg), and butyl ethyl magnesium (BuEtMg or BuMgEt).

The ionic activator may be selected from the group consisting of: (i) compounds of the formula $[R^5]^+ [B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$, wherein each $R^7$ is independently selected from the group consisting of a hydrogen atom and a $C_{1-4}$ alkyl radical; and (ii) compounds of the formula $[(R^8)_t ZH]^+ [B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)$ 3 wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. PhR$^8_2$NH$^+$, which is substituted by two $R^8$ radicals such as for example two $C_{1-4}$ alkyl radicals).

Examples of compounds capable of ionizing the phosphinimine catalyst include the following compounds: triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyl-trispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4, 5-trifluorophenyl) borate, benzene (diazonium) tetrakis (3,4, 5-trifluorophenyl) borate, tropillium tetrakis (1,2,2-trifluoroethenyl) borate, trophenylnnethylium tetrakis (1,2, 2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3, 4,5-tetrafluorophenyl) borate, and benzene (diazonium) tetrakis (2,3,4,5-tetrafluorophenyl) borate.

Commercially available activators which are capable of ionizing the group 4 metal of the phosphinimine catalyst include: N,N-dimethylaniliniumtetrakispentafluorophenyl borate ("[Me$_2$NHPh][B(CGF$_5$)$_4$]"); triphenylmethylium tetrakispentafluorophenyl borate ("[Ph$_3$C][B(CeF$_5$)$_4$]"); and trispentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

Addition of the Phosphinimine Catalyst and Co-Catalyst to the Passivated Support The present invention is not limited to any particular procedure for supporting the phosphinimine catalyst or the co-catalyst. Processes for depositing a single site catalyst complex (e.g. a phosphinimine catalyst) and/or a co-catalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support a single site catalyst see U.S. Pat. No. 5,965,677). For example, the phosphinimine catalyst may be added to the passivated support by co-precipitation with the support material. The co-catalyst can be added to the passivated support before and/or after the phosphinimine catalyst or together with the phosphinimine catalyst (e.g. a phosphinimine catalyst may be mixed with a co-catalyst in a suitable solvent or diluents and the mixture added to the passivated support). Optionally, the co-catalyst can be added to a supported phosphinimine catalyst in situ or en route to a reactor. The phosphinimine catalyst and/or co-catalyst may be slurried or dissolved in a suitable diluent or solvent respectively and then added to the passivated support. Suitable solvents or diluents include but are not limited to hydrocarbons and mineral oil. The phosphinimine catalyst may be added to the solid passivated support, in the form of a solid, solution or slurry, followed by the addition of the co-catalyst in solid form or as a solution or slurry. The co-catalyst may be added to the solid passivated support, in the form of a solid, solution or slurry, followed by the addition of the phosphinimine catalyst in solid form or as a solution or slurry. Phosphinimine catalyst, co-catalyst, and passivated support can be mixed together in the presence or absence of a diluent(s) or a solvent(s), but use of diluent(s) or solvent(s) is preferred.

The loading of the phosphinimine catalyst on the passivated support is not specifically defined, but by way of non-limiting example, the loading of a phosphinimine catalyst on a passivated support can be from about 0.005 to 0.1, or from about 0.01 to 0.05, or from about 0.015 to 0.04, or from about 0.015 to 0.035 mmol of the phosphinimine catalyst per gram of catalyst. In further embodiments of the invention, the loading of a phosphinimine catalyst on the passivated support may be from about 0.020 to 0.031 mmol, or from about 0.025 to 0.03 mmol of the phosphinimine catalyst per gram of catalyst.

The Polymerization Process

Olefin polymerization processes which are compatible with the current invention include gas phase, slurry phase and combined gas phase/slurry phase polymerization processes.

In an embodiment of the invention, ethylene copolymerization with an alpha-olefin is carried out in the gas phase, in for example at least one fluidized bed reactor.

The olefin polymerization catalyst may be fed to a reactor system in a number of ways. The polymerization catalyst may be fed to a reactor in dry mode using a dry catalyst feeder, examples of which are well known in the art. Alternatively, the polymerization catalyst may be fed to a reactor as a slurry in a suitable diluent. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Solvents which will not extract appreciable amounts of the single site catalyst (e.g. a phosphinimine catalyst) or the co-catalyst away from the inert support are preferred. The (olefin) polymerization catalyst components, which include at least one single site catalyst, at least one passivated support and at least one co-catalyst, may be combined offline and prior to their addition to a polymerization zone, or they may be combined en route to a polymerization zone.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to about 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000 to 9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of letdown valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,482,687; 4,543,399; 4,588,790; 5,028,670; 5,317,036; 5,352,749; 5,405,922; 5,436,304; 5,453,471; 5,462,999; 5,616,661 and 5,668,228). In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from the group consisting of $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethyl-idene-2-norbornene, bicyclo-(2,2,1)-hepta-2,5-diene).

In an embodiment, the invention is directed toward a polymerization process involving the polymerization of one or more of the monomer(s) and comonomer(s) including ethylene alone or in combination with one or more linear or branched comonomer(s) having from 3 to 30 carbon atoms, preferably 3-12 carbon atoms, more preferably 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-heptene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In an embodiment of the present invention, ethylene is copolymerized with an alpha olefin having from 3-8 carbon atoms and ethylene makes up at least 75 wt % of the total olefin feed entering the reactor.

In an embodiment of the present invention, ethylene is copolymerized with an alpha olefin having from 3-8 carbon atoms and ethylene makes up at least 85 wt % of the total olefin feed entering the reactor.

In embodiments of the present invention, ethylene is copolymerized with propylene, 1-butene, 1-hexene or 1-octene.

In an embodiment of the present invention, ethylene is copolymerized with 1-butene and ethylene makes up at least 75 weight percent (wt %) of the total olefin feed entering the reactor.

In an embodiment of the present invention, ethylene is copolymerized with 1-hexene and ethylene makes up at least 75 wt % of the total olefin feed entering the reactor.

In an embodiment of the present invention, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current invention to use a polymer seed bed that has been treated with an antistatic agent or an optional scavenger. In addition, the polymer products obtained by using the catalysts and processes of the current invention may themselves be used as polymer seed bed materials.

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula: $R^3{}_2Al^1O(R^3Al^1O)_mAl^1R^3{}_2$ wherein each $R^3$ is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of aluminum:metal (where metal is the metal of the phosphinimine catalyst) of from about 20 to about 2000, or from about 50 to about 1000, or from about 100 to about 500. Generally the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

The scavenger can be fed to the reactor using any suitable means and may be diluted or dissolved in a suitable liquid hydrocarbon diluent or solvent respectively.

The polymerization process may be carried out in the presence of any suitable anti-static agent or agents. The use of anti-static agents in a gas-phase or a slurry phase polymerization processes is well known in the art. Antistatic agents are also recognized in the art by the term "continuity additive". Generally speaking a "continuity additive" is a substance or a mixture of substances which, when present in appropriate amounts, can reduce, prevent or mitigate at least one of fouling, sheeting, and static level of a material in polymerization reactor.

Some non-limiting examples of continuity additives are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Other possible continuity additives are described in European Pat. Appl. No. 107, 127, including polyoxyethylenealkylamines.

Specific examples of alkoxylated amines which may be used in the present invention are Kemamine™ AS-990, ARMOSTAT™ 1800, and ATMER™ 163 which are available from Ciba, Akzo-Nobel or Witco Chemical Company. Other suitable continuity additives include aluminum stearate and aluminum oleate. Still other specific continuity additives are supplied commercially under the trademarks OCTASTAT™, STADIS™ and SAFESTAT™. The continuity additive STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid.

In an embodiment of the invention, a continuity additive is added directly to the polymerization catalyst. The amount of continuity additive added to a catalyst will depend on a number of factors such as but not limited to the type of continuity additive and the type of polymerization catalyst (and the type of support). Accordingly the amount of continuity additive used is not specifically defined, but can be from 0 (e.g. optionally) up to 150,000 parts per million (ppm) based on the weight of the supported catalyst. Alternatively, the amount of continuity additive added to a catalyst can be from about 0.2 to 10 weight percent based on the total weight of the catalyst system. By way of non-limiting example only, from 10,000 to 30,000 ppm of a STADIS continuity additive is used when it is combined with a supported polymerization catalyst.

In an embodiment of the invention a catalyst modifier is added directly to the polymerization catalyst as is described in U.S. Pat. Appl. No. 2012/0316297.

In an embodiment of the invention, the polymerization catalyst comprises: i) a phosphinimine catalyst; ii) a passivated support; iii) a co-catalyst; and iv) a catalyst modifier; wherein the catalyst modifier is present in from 0.5 to 4.5 weight percent based on the weight of i), ii) and iii) of the polymerization catalyst and comprises a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In another embodiment, the antistatic agent may be added directly to the reactor and separately from the polymerization catalyst. The total amount of continuity additive or additives to be present in the reactor will generally not exceed 250 or 200, or 150, or 125, or 100, or 90, or 80, or 70 or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives. The total amount of one or two or more continuity additives in the reactor will be understood to be additive and where the total amount can be described as disclosed immediately above. The continuity additive can be added directly to the reactor through a dedicated feed line, and/or added to any convenient feed stream, including the ethylene feed stream, the comonomer feed stream, the catalyst feed line, or the recycle line. If more than one continuity additive is used, each one may be added to the reactor as separate feed streams, or as any combination of separate feed streams or mixtures. The manner in which the continuity additives are added to the reactor is not important, so long as the additive(s) are well dispersed within the fluidized bed, and that their feed rates (or concentrations) are regulated in a manner to provide minimum levels of fouling and/or static. From the productivity of the catalyst it is fairly routine to determine the feed rate of the antistatic agent to the reactor based on the catalyst feed rate.

In another embodiment of the invention, the continuity additive (e.g. antistatic agent) may be added directly to the reactor and separately from the polymerization catalyst as well as added directly to the supported catalyst.

The Ethylene Copolymer

In the present invention, the term "ethylene copolymer" is used interchangeably with the term "copolymer", or "polyethylene copolymer" and all connote a polymer consisting of polymerized ethylene units and at least one type of polymerized alpha olefin.

In an embodiment of the invention, the ethylene copolymers are preferably not polymer blends, but optionally they may be used as a component in a polymer blend. The term polymer "blend" is herein meant to connote a dry blend of two dissimilar or different polymers, in-reactor blends arising from the use of multi or mixed catalyst systems in a single reactor zone, and blends that result from the use of one catalyst in at least two reactors operating under different polymerization conditions, or blends involving the use of at least two distinct catalysts in one or more reactors under the same or different conditions (e.g. a blend resulting from in series reactors each running under different conditions or with structurally different catalysts).

In an embodiment of the invention, preferably the ethylene copolymer compositions are copolymers of ethylene and an alpha olefin selected from 1-butene, 1-hexene and 1-octene.

In embodiments of the invention, the ethylene copolymer composition will comprise at least 75 wt % of ethylene units, or at least 80 wt % of ethylene units, or at least 85 wt % of ethylene units with the balance being an alpha-olefin unit, based on the weight of the ethylene copolymer composition.

In embodiments of the invention, the ethylene copolymer will have a melt index ($I_2$) of from 0.01 to 3.0 g/10 min, or from 0.1 to 2.5 g/10 min, or from 0.1 to 2.0 g/10 min, or from 0.25 to 2.0 g/10 min, or from 0.01 to 1.0 g/10 min, or from 0.1 to 1.0 g/10 min, or less than 1.0 g/10 min, or from 0.1 to less than 1.0 g/10 min, or from 0.25 to 1.0 g/10 min, or from 0.25 to 0.9 g/10 min, or from 0.25 to 0.80 g/10 min, or from 0.2 to 0.9 g/10 min, or from 0.20 to 0.85 g/10 min, or from 0.25 to 0.85 g/10 min. In embodiments of the invention, the ethylene copolymer will have a melt index ($I_2$) of from 1.0 to 2.0 g/10 min, or from 1.0 to 1.75 g/10 min, or from 1.0 to 1.5 g/10 min.

In embodiments of the invention, the ethylene copolymer will have a density of from 0.916 g/cc to 0.936 g/cc including narrower ranges within this range, such as for example, from 0.916 g/cc to 0.935 g/cc, or from 0.916 g/cc to 0.932 g/cc, or from 0.916 g/cc to 0.930 g/cc, or from 0.917 g/cc to 0.932 g/cc, or from 0.916 g/cc to 0.930 g/cc, or from 0.917 g/cc to 0.930 g/cc, or from 0.916 g/cc to 0.925 g/cc, or from 0.917 g/cc to 0.927 g/cc, or from 0.917 g/cc to 0.926 g/cc, or from 0.917 g/cc to 0.925 g/cc, or from 0.917 g/cc to 0.923 g/cc, or from 0.918 g/cc to 0.932 g/cc, or from 0.918 g/cc to 0.930 g/cc, or from 0.918 to 0.928 g/cc, or from 0.920 to 0.935 (note: "g" stands for gram; "cc" stands for cubic centimeter, $cm^3$).

In an embodiment of the invention, the ethylene copolymer will have a density of from 0.916 g/cc to 0.936 g/cc. In an embodiment of the invention, the ethylene copolymer will have a density of greater than 0.916 g/cc to less than 0.930 g/cc. In an embodiment of the invention, the ethylene copolymer will have a density of from 0.917 g/cc to 0.927 g/cc. In an embodiment of the invention, the ethylene copolymer will have a density of from 0.918 g/cc to 0.925 g/cc.

The ethylene copolymer may have a unimodal, broad unimodal, bimodal, or multimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal profile. By the term "bimodal" it is meant that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the invention, the ethylene copolymer will have a unimodal profile in a gel permeation chromatography (GPC) curve generated according to the method of ASTM D6474-99. The term "unimodal" is herein defined to mean there will be only one significant peak or maximum evident in the GPC-curve. A unimodal profile includes a broad unimodal distribution curve or profile.

In embodiments of the invention, the ethylene copolymer will exhibit a weight average molecular weight ($M_w$) as determined by gel permeation chromatography (GPC) of from 30,000 to 250,000, including narrower ranges within this range, such as for example, from 50,000 to 200,000, or from 50,000 to 175,000, or from 75,000 to 150,000, or from 80,000 to 130,000.

In embodiments of the invention, the ethylene copolymer will exhibit a number average molecular weight ($M_n$) as determined by gel permeation chromatography (GPC) of from 5,000 to 100,000 including narrower ranges within this range, such as for example from 7,500 to 100,000, or from 7,500 to 75,000, or from 7,500 to 50,000, or from 10,000 to 100,000, or from 10,000 to 75,000, or from 10,000 to 50,000.

In embodiments of the invention, the ethylene copolymer will exhibit a Z-average molecular weight ($M_z$) as determined by gel permeation chromatography (GPC) of from 50,000 to 1,000,000 including narrower ranges within this range, such as for example from 75,000 to 750,000, or from 100,000 to 500,000, or from 100,000 to 400,000, or from 125,000 to 375,000, or from 150,000 to 350,000, or from 175,000 to 375,000, or from 175,000 to 400,000, or from 200,000 to 400,000 or from 225,000 to 375,000.

In embodiments of the invention, the ethylene copolymer will have a molecular weight distribution ($M_w/M_n$) as determined by gel permeation chromatography (GPC) of from 2.3 to 5.5, including narrower ranges within this range, such as for example, from 2.3 to 5.0, or 2.3 to 4.75, or from 2.3 to 4.5, or from 2.3 to 4.0, or from 2.5 to 5.5, or from 2.5 to 5.0, or from 2.5 to 4.75, or from 2.5 to 4.5, or from 2.6 to 5.0, or from 2.6 to 4.75, or from 2.6 to 4.5, or from 2.8 to 5.0, or from 2.8 to 4.5. In still further embodiments of the invention, the ethylene copolymer will have a molecular weight distribution ($M_w/M_n$) as determined by gel permeation chromatography (GPC) of from 2.3 to 4.25, or from 2.3 to 4.0, or from 2.5 to 4.25, or from 2.5 to 4.0, or from 2.75 to 4.25, or from 2.75 to 4.0, or from 2.75 to 3.75, or from 2.75 to 3.5.

In embodiments of the invention, the ethylene copolymer will have a z-average molecular weight distribution ($M_z/M_w$) as determined by gel permeation chromatography (GPC) of less than 4.5, or less than 4.0, or less the 3.5, or less than 3.0, or less than 2.5. In further embodiments of the invention, the ethylene copolymer will have a z-average molecular weight distribution ($M_z/M_w$) as determined by gel permeation chromatography (GPC) of or from 1.5 to 4.5, including narrower ranges within this range, such as for example, from 1.75 to 4.5, or from 1.75 to 4.0, or from 1.75 to 3.5, or from 1.75 to 3.0, or from 1.75 to 2.5, or from 2.0 to 4.0, or from 2.0 to 3.5, or from 2.0 to 3.0, or from 2.0 to 2.5.

In an embodiment of the invention, the ethylene copolymer will have a flat comonomer incorporation profile as measured using gel permeation chromatography with Fourier transform Infrared detection (GPC-FTIR). In an embodiment of the invention, the ethylene copolymer will have a negative (i.e. "normal") comonomer incorporation profile as measured using GPC-FTIR. In an embodiment of the invention, the ethylene copolymer will have an inverse (i.e. "reverse") or partially inverse comonomer incorporation profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse (d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse".

In an embodiment of the invention the ethylene copolymer has a reversed comonomer incorporation profile as measured using GPC-FTIR.

In an embodiment of the invention, the ethylene copolymer will have a comonomer incorporation profile as determined by GPC-FTIR which satisfies the following condition: SCB/1000 C at MW of 200,000–SCB/1000 C at MW of 50,000 is greater than 0; where "–" is a minus sign, SCB/1000 C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition: SCB/1000 C at MW of 200,000–SCB/1000 C at MW of 50,000 is greater than 0.5; where SCB/1000 C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition: SCB/1000 C at MW of 200,000–SCB/1000 C at MW of 50,000 is greater than 1.0; where SCB/1000 C is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition: SCB/10000 at MW of 200,000–SCB/10000 at MW of 50,000 is greater than 2.0; where SCB/10000 is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition: SCB/1000 C at MW of 200,000–SCB/1000 C at MW of 50,000 of from 0.1 to 5.0 including narrower ranges within this range; where SCB/10000 is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition: SCB/10000 at MW of 200,000–SCB/10000 at MW of 50,000 of from 0.5 to 4.0 including narrower ranges within this range; where SCB/10000 is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a comonomer incorporation profile as determined by GPC-FTIR which satisfies the following condition: SCB/10000 at MW of 200,000–SCB/10000 at MW of 50,000 of from 1.0 to 3.5 including narrower ranges within this range; where SCB/10000 is the comonomer content determined as the number of short chain branches per thousand carbons and MW is the corresponding molecular weight (i.e. the absolute molecular weight) on a GPC or GPC-FTIR chromatograph.

In an embodiment of the invention, the ethylene copolymer will have a melt flow ratio (the MFR=$I_{21}/I_2$) of greater than 20 but less than 46. In an embodiment of the invention, the ethylene copolymer will have a melt flow ratio (the MFR=$I_{21}/I_2$) of greater than 22 but less than 42. In an embodiment of the invention, the ethylene copolymer will have a melt flow ratio (the MFR=$I_{21}/I_2$) of greater than 22 but less than 40. In further embodiments of the invention the ethylene copolymer will have a melt flow ratio of from 22 to 44, or from 22 to 42, or from 24 to 40, or from 24 to 38, or from 26 to 40, or from 26 to 38, or from 28 to 40, or from 28 to 38. In still further embodiments of the invention the ethylene copolymer will have a melt flow ratio of greater than 24 but less than 44, or greater than 24 but less than 40, or greater than 26 but less than 42, or greater than 26 but less than 40, or greater than 26 but less than 38, or greater than 26 but less than 36, or from 24 to 38, or from 26 to 36, or from 26 to 34.

The composition distribution of a polymer can be characterized by the short chain distribution index (SCDI) or composition distribution breadth index (CDBI). The definition of composition distribution breadth index ($CDBI_{50}$) can be found in U.S. Pat. No. 5,206,075 and PCT publication WO 93/03093. The $CDBI_{50}$ is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 or in U.S. Pat. No. 4,798,081 can be employed. From the weight fraction versus composition distribution curve, the $CDBI_{50}$ is determined by establishing the weight percentage of a copolymer sample that has a comonomer content within 50% of the median comonomer content on each side of the median.

In embodiments of the invention, the ethylene copolymer will have a composition distribution breadth index $CDBI_{50}$, as determined by temperature elution fractionation (TREF) of from 45% to 80% by weight, or from 45% to 75% by weight, or from 50% to 75% by weight, or from 50% to 80% by weight, or from 55% to 75% by weight, or from 55% to 70% by weight.

The composition distribution of an ethylene copolymer may also be characterized by the T(75)–T(25) value, where the T(25) is the temperature at which 25 wt % of the eluted copolymer is obtained, and T(75) is the temperature at which 75 wt % of the eluted copolymer is obtained in a TREF experiment.

In an embodiment of the present invention, the ethylene copolymer will have a T(75)–T(25) of from 3 to 25° C. as determined by TREF. In an embodiment of the present invention, the ethylene copolymer will have a T(75)–T(25) of from 3 to 22.5° C. as determined by TREF. In an embodiment of the present invention, the ethylene copolymer will have a T(75)–T(25) of from 3 to 20° C. as determined by TREF. In an embodiment of the present invention, the ethylene copolymer will have a T(75)–T(25) of from 5 to 20° C. as determined by TREF. In an embodiment of the present invention, the ethylene copolymer will have a T(75)–T(25) of from 5 to 17.5° C. as determined by TREF. In an embodiment of the present invention, the ethylene copolymer will have a T(75)–T(25) of from 5 to 15° C. as determined by TREF.

In embodiments of the invention, the ethylene copolymer will have a CY a-parameter (also called the Carreau-Yasuda shear exponent) of from 0.01 to 0.4, or from 0.05 to 0.4, or from 0.05 to 0.3, or from 0.01 to 0.3, or from 0.01 to 0.25, or from 0.01 to 0.20, or from 0.05 to 0.20.

In embodiments of the invention, the ethylene copolymer will have a normalized shear thinning index, SHI @0.1 rad/s (i.e. the $\eta^*_{0.1}/\eta_0$) of from 0.001 to 0.75, or from 0.001 to 0.6, or from 0.001 to 0.5, or from 0.001 to 0.3, or from 0.010 to 0.027, or less than 0.75, or less than 0.6, or less than 0.5, or less than 0.4, or less than 0.3, or greater than 0.001 and less than 0.3, or greater than 0.01 and less than 0.3.

In an embodiment of the invention, the ethylene copolymer will have a TREF profile, as measured by temperature rising elution fractionation, which is multimodal, comprising at least two elution intensity maxima or peaks.

In an embodiment of the invention, the ethylene copolymer will have a TREF profile, as measured by temperature rising elution fractionation, which is bimodal, and so having two elution intensity maxima or peaks.

In an embodiment of the invention, the ethylene copolymer will have an amount of copolymer eluting at a temperature at or below 40° C., of less than 5 wt % as determined by temperature rising elution fractionation (TREF).

In an embodiment of the invention, the ethylene copolymer will have an amount of copolymer eluting at a temperature of from 90° C. to 105° C., of from 3 to 25 wt % as determined by temperature rising elution fractionation (TREF). In an embodiment of the invention, from 5 to 25 wt % of the ethylene copolymer will be represented within a temperature range of from 90° C. to 105° C. in a TREF profile. In an embodiment of the invention, from 5 to 22.5 wt % of the ethylene copolymer will be represented within a temperature range of from 90° C. to 105° C. in a TREF profile. In an embodiment of the invention, from 7 to 25 wt % of the ethylene copolymer will be represented within a temperature range of from 90° C. to 105° C. in a TREF profile. In another embodiment of the invention, from 7 to 22.5 wt % of the ethylene copolymer will be represented at a temperature range of from 90° C. to 105° C. in a TREF profile. In another embodiment of the invention, from 7 to 20.0 wt % of the ethylene copolymer will be represented at a temperature range of from 90° C. to 105° C. in a TREF profile.

In embodiments of the invention, less than 1 wt %, or less than 0.5 wt %, or less than 0.05 wt %, or 0 wt % of the ethylene copolymer will elute at a temperature of above 100° C. in a TREF analysis.

In an embodiment of the invention, the ethylene copolymer will have a TREF profile, as measured by temperature rising elution fractionation, comprising: i) a multimodal TREF profile comprising at least two elution intensity maxima (or peaks); ii) less than 5 wt % of the copolymer represented at a temperature at or below 40° C.; and iii) from 5 to 25 wt % of the copolymer represented at a temperature of from 90° C. to 105° C.

In an embodiment of the invention, the ethylene copolymer will have a TREF profile, as measured by temperature rising elution fractionation, comprising: i) a bimodal TREF profile with two elution intensity maxima (or peaks); ii) less than 5 wt % of the copolymer represented at a temperature at or below 40° C.; and iii) from 5 to 25 wt % of the copolymer represented at a temperature of from 90° C. to 105° C.

With reference to FIG. 3, in an embodiment of the invention, the ethylene copolymer will have two intensity maxima or elution peaks in a TREF profile, the first of which occurs at a lower temperature and is defined as T(low), the second of which occurs at a higher temperature and is defined as T(high).

In an embodiment of the invention, the ethylene copolymer has a multimodal TREF profile defined by at least two intensity maxima (or peaks) occurring at elution temperatures T(low), and T(high), where T(low) is from 75° C. to 90° C., and T(high) is from 90° C. to 98° C., provided that T(low) is lower than T(high).

In an embodiment of the invention, the ethylene copolymer has a bimodal TREF profile defined by at two intensity maxima (or peaks) occurring at elution temperatures T(low), and T(high), where T(low) is from 75° C. to 90° C., and T(high) is from 90° C. to 98° C., provided that T(low) is lower than T(high).

In an embodiment of the invention, the ethylene copolymer has a bimodal TREF profile defined by at two intensity maxima (or peaks) occurring at elution temperatures T(low), and T(high), where T(low) is from 75° C. to 89° C., and T(high) is from 90° C. to 98° C.

In an embodiment of the invention, the ethylene copolymer has a multimodal TREF profile defined by at least two elution intensity maxima (or peaks) occurring at elution temperatures T(low), and T(high), where T(high)−T(low) is from 3° C. to 22.5° C., or from 3° C. to 20° C., or from 5° C. to 20° C., or from 5° C. to 17.5° C., or from 5° C. to 15° C., or from 5° C. to 12.5° C., or from 5° C. to 10° C.

In an embodiment of the invention, the ethylene copolymer has a bimodal TREF profile defined by two elution intensity maxima (or peaks) occurring at elution temperatures T(low), and T(high), where T(high)−T(low) is from 3° C. to 22.5° C., or from 3° C. to 20° C., or from 5° C. to 20° C., or from 5° C. to 17.5 C, or from 5° C. to 15° C., or from 5° C. to 12.5° C., or from 5° C. to 10° C.

In an embodiment of the invention, the ethylene copolymer has a multimodal TREF profile defined by at least two intensity maxima (or peaks) occurring at elution temperatures T(low), and T(high), where T(low) is from 70° C. to 90 C, and T(high) is from 90° C. to 98° C., provided that T(low) is below T(high), where T(high)−T(low) is from 3° C. to 25° C., or from 3° C. to 22.5° C., or from 3° C. to 20° C., or from 5° C. to 20° C., or from 5° C. to 17.5° C., or from 5° C. to 15° C., or from 5° C. to 12.5° C., or from 5° C. to 10° C.

In an embodiment of the invention, the ethylene copolymer has a bimodal TREF profile defined by two intensity maxima (or peaks) occurring at elution temperatures T(low), and T(high), where T(low) is from 70° C. to 90° C., and T(high) is from 90° C. to 98° C., provided that T(low) is below T(high), where T(high)−T(low) is from 3° C. to 25° C., or from 3° C. to 22.5° C., or from 3° C. to 20° C., or from 5° C. to 20° C., or from 5° C. to 17.5° C., or from 5° C. to 15° C., or from 5° C. to 12.5° C., or from 5° C. to 10° C.

In an embodiment of the invention, the ethylene copolymer has a multimodal TREF profile defined by at least two elution intensity maxima (or peaks) occurring at elution temperatures T(low), and T(high), where the intensity of the peak at T(low) is greater than the intensity of the peak at T(high).

In an embodiment of the invention, the ethylene copolymer has a bimodal TREF profile defined by two elution intensity maxima (or peaks) occurring at elution temperatures T(low), and T(high), where the intensity of the peak at T(low) is greater than the intensity of the peak at T(high).

In an embodiment of the invention, the ethylene copolymer has a multimodal TREF profile comprising two elution intensity maxima (or peaks) occurring at elution temperatures T(low), and T(high), where the intensity of the peak at T(low) is greater than the intensity of the peak at T(high), and where T(high)−T(low) is from 3° C. to 25° C., or from 3° C. to 22.5° C., or from 3° C. to 20° C., or from 5° C. to 20° C., or from 5° C. to 17.5° C., or from 5° C. to 15° C., or from 5° C. to 12.5° C., or from 5° C. to 10° C.

In an embodiment of the invention, the ethylene copolymer has a bimodal TREF profile defined by two elution intensity maxima (or peaks) occurring at elution temperatures T(low), and T(high), where the intensity of the peak at T(low) is greater than the intensity of the peak at T(high), and where T(high)−T(low) is from 3° C. to 25° C., or from 3° C. to 22.5° C., or from 3° C. to 20° C., or from 5° C. to 20° C., or from 5° C. to 17.5° C., or from 5° C. to 15° C., or from 5° C. to 12.5° C., or from 5° C. to 10° C.

In an embodiment of the invention, the ethylene copolymer has a bimodal TREF profile defined by two elution intensity maxima (or peaks) occurring at elution temperatures T(low), and T(high), where the intensity of the peak at T(low) is greater than the intensity of the peak at T(high), and where T(low) is from 75° C. to 90° C., T(high) is from 90° C. to 98° C., provided that T(low) is lower than T(high).

In an embodiment of the invention, the ethylene copolymer has a bimodal TREF profile defined by two elution intensity maxima (or peaks) occurring at elution temperatures T(low), and T(high), where the intensity of the peak at T(low) is greater than the intensity of the peak at T(high), and where T(low) is from 75° C. to 90° C., T(high) is from 90° C. to 98° C., provided that T(low) is lower than T(high); and where T(high)−T(low) is from 3° C. to 25° C., or from 3° C. to 22.5° C., or from 3° C. to 20° C., or from 3° C. to 17.5° C., or from 3° C. to 15° C., or from 5° C. to 20° C., or from 5° C. to 17.5° C., or from 5° C. to 15° C., or from 5° C. to 12.5° C., or from 5° C. to 10° C.

In embodiments of the invention, the ethylene copolymer will have a hexane extractables level of ≤2.0 wt %, or ≤1.5 wt % or ≤1.0 wt %. In an embodiment of the invention, the copolymer has a hexane extractables level of from 0.1 to 2.0 wt %, or from 0.15 to 2.0 wt %, or from 0.1 to 1.5 wt %, or from 0.1 to 1.0 wt %, or from 0.1 to 0.75 wt %, or from 0.1 to 0.5 wt %.

In an embodiment, the ethylene copolymers made using the process of the current invention will have good bulk density. In embodiments of the invention the ethylene copolymer obtained from a polymerization process will have a settled bulk density of at least 22 lb/ft$^3$, or at least 24 lb/ft$^3$, or at least 26 lb/ft$^3$, or at least 28 lb/ft$^3$, or at least 30 lb/ft$^3$. In further embodiments, the ethylene copolymer obtained from a polymerization process will have a settled bulk density of from 22 lb/ft$^3$ to 34 lb/ft$^3$, or from 24 lb/ft$^3$ to 34 lb/ft$^3$, or from 26 lb/ft$^3$ to 34 lb/ft$^3$.

In an embodiment of the invention, the ethylene copolymer has a $\delta^{XO}<80°$, or less than 75°, or less than 70°, or less than 65° or less than 60°, where $\delta^{XO}$ is the crossover phase angle from a Van Gurp-Palmen (VGP) plot as determined by dynamic mechanical analysis (DMA).

In an embodiment of the invention, the ethylene copolymer satisfies the following: $45°≤\delta^{XO}≤75°$, where $\delta^{XO}$ is the crossover phase angle from a Van Gurp-Palmen (VGP) plot as determined by dynamic mechanical analysis (DMA).

In an embodiment of the invention, the ethylene copolymer satisfies the following: $50°≤\delta^{XO}≤70°$, where $\delta^{XO}$ is the crossover phase angle from a Van Gurp-Palmen (VGP) plot as determined by dynamic mechanical analysis (DMA).

In an embodiment of the invention, the ethylene copolymer satisfies the following: $55°≤\delta^{XO}≤70°$, where $\delta^{XO}$ is the crossover phase angle from a Van Gurp-Palmen (VGP) plot as determined by dynamic mechanical analysis (DMA).

In an embodiment of the invention, the ethylene copolymer satisfies the following: $55°≤\delta^{XO}≤65°$, where $\delta^{XO}$ is the crossover phase angle from a Van Gurp-Palmen (VGP) plot as determined by dynamic mechanical analysis (DMA).

Film Production

The ethylene copolymer described above can be converted into film.

The extrusion-blown film process is a well-known process for the preparation of plastic film. The process employs an extruder which heats, melts and conveys the molten plastic and forces it through an annular die. Typical extrusion temperatures are from 330 to 500° F., especially 350 to 460° F.

A polyethylene copolymer film may be drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation (in both the machine direction and the axial or cross direction).

A balance of "machine direction" ("MD") and "transverse direction" ("TD"-which is perpendicular to MD) molecular orientation is generally considered desirable for the films associated with the invention (for example, Dart Impact strength, Machine Direction and Transverse Direction tear properties may be affected).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together.

In an embodiment of the invention, films are prepared using the above described blown film process.

An alternative process is the so-called cast film process, wherein polyethylene is melted in an extruder, then forced through a linear slit die, thereby "casting" a thin flat film. The extrusion temperature for cast film is typically somewhat hotter than that used in the blown film process (with typically operating temperatures of from 450 to 550° F.). In general, cast film is cooled (quenched) more rapidly than blown film.

In an embodiment of the invention, films are prepared using a cast film process.

The film or film layer may, by way of non-limiting example only, have a total thickness ranging from 0.5 mils to 4 mils (note: 1 mil=0.0254 mm), which will depend on for example the die gap employed during film casting or film blowing.

The above description applies to monolayer films. However, the film may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The film may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film (for example, as used in the production of produce packaging). The phrase "sealant layer" refers to a film that is involved in the sealing of the film to itself or to another layer in a multilayer film. A "tie layer" refers to any internal layer that adheres two layers to one another.

By way of example only, the thickness of the multilayer films can be from about 0.5 mil to about 10 mil total thickness.

The films can be used for heavy duty bags, shrink film, agricultural film, garbage bags and shopping bags. The films can be produced by blow extrusion, cast extrusion, co-extrusion and be incorporated also in laminated structures.

Additives

The ethylene copolymer described above may also contain additives, such as for example, primary antioxidants (such as hindered phenols, including vitamin E); secondary antioxidants (especially phosphites and phosphonites); nucleating agents, plasticizers or polymer processing aids PPAs (e.g. fluoroelastomer and/or polyethylene glycol bound process aid), acid scavengers, stabilizers, anticorrosion agents, blowing agents, other ultraviolet light absorbers such as chain-breaking antioxidants, etc., quenchers, anti-static agents, slip agents, anti-blocking agent, pigments, dyes and fillers and cure agents such as peroxide.

These and other common additives in the polyolefin industry may be present in copolymer compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In an embodiment of the invention, antioxidants and stabilizers such as organic phosphites and phenolic antioxidants may be present in the ethylene copolymer compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and tris (nonyl phenyl) phosphite (WESTON 399). Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present in the ethylene copolymer from 0.1 to 50 wt % in one embodiment, and from 0.1 to 25 wt % of the composition in another embodiment, and from 0.2 to 10 wt % in yet another embodiment. Fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may include any other fillers and porous fillers and supports which are known in the art.

Fatty acid salts may also be present in the ethylene copolymer. Such salts may be present from 0.001 to 2 wt % of the copolymer composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of an ethylene copolymer and one or more additives, sufficient mixing should take place to assure that a uniform blend will be produced prior to conversion into a finished product. The ethylene copolymer can be in any physical form when used to blend with the one or more additives. In one embodiment, reactor granules, defined as the granules of polymer that are isolated from the polymerization reactor, are used to blend with the additives. The reactor granules have an average diameter of from 10 µm to 5 mm, and from 50 µm to 10 mm in another embodiment. Alternately, the ethylene copolymer is in the form of pellets, such as, for example, having an average diameter of from 1 mm to 6 mm that are formed from melt extrusion of the reactor granules.

One method of blending the additives with the ethylene copolymer is to contact the components in a tumbler or other physical blending means, the copolymer being in the form of reactor granules. This can then be followed, if desired, by melt blending in an extruder. Another method of blending the components is to melt blend the ethylene copolymer pellets with the additives directly in an extruder, or any other melt blending means.

Film Properties

The film, or film layer of the present invention is made from the ethylene copolymers defined as above. Generally, an additive as described above is mixed with the ethylene copolymer prior to film production.

In embodiments of the invention, a film will have a dart impact strength of ≥180 g/mil, or ≥190 g/mil, or ≥200 g/mil.

In embodiments of the invention, a 1 mil film will have a MD (machine direction) secant modulus at 1% strain of ≥170 MPa, or ≥180 MPa, or ≥190 MPa, or ≥200 Mpa, or ≥210 MPa.

In embodiments of the invention, a 1 mil film will have a TD (transverse direction) secant modulus at 1% strain of ≥170 MPa, or ≥180 MPa, or ≥190 MPa, or ≥200 MPa, or ≥210 MPa, or ≥220 Mpa, or ≥230 MPa, or ≥240 MPa.

In embodiments of the invention, a film will have a ratio of MD tear to TD tear (MD tear/TD tear) of less than 0.75, or ≤0.70, or ≤0.60, or ≤0.50, or ≤0.45, or ≤0.40, or ≤0.35, or ≤0.30, or ≤0.25, ≤0.20. In another embodiment of the invention, the film will have a ratio of MD tear to TD tear of from 0.010 to 0.75. In yet another embodiment of the invention, the film will have a ratio of MD tear to TD tear of from 0.05 to 0.6. In still another embodiment of the invention, the film will have a ratio of MD tear to TD tear of from 0.05 to 0.55. In still yet further embodiments of the invention, the film will have a ratio of MD tear to TD tear of from 0.1 to 0.50 or from 0.1 to 0.35.

In embodiments of the invention, a 1 mil film will have a machine direction (MD) secant modulus at 1% strain of ≥140 MPa, or ≥150 MPa, or ≥160 MPa, or ≥175 MPa, or ≥180 MPa≥190 MPa, or ≥200 Mpa, or ≥210 MPa. In an embodiment of the invention, a 1 mil film will have a machine direction (MD) secant modulus at 1% strain of from 130 MPa to 300 MPa. In an embodiment of the invention, a 1 mil film will have a machine direction (MD) secant modulus at 1% strain of from 140 MPa to 300 MPa. In an embodiment of the invention, a 1 mil film will have a machine direction (MD) secant modulus at 1% strain of from 140 MPa to 275 MPa. In an embodiment of the invention, a 1 mil film will have a machine direction (MD) secant modulus at 1% strain of from 140 MPa to 250 MPa. In an embodiment of the invention, a 1 mil film will have a machine direction (MD) secant modulus at 1% strain of from 150 MPa to 260 MPa. In an embodiment of the invention, a 1 mil film will have a machine direction (MD)

secant modulus at 1% strain of from 160 MPa to 260 MPa. In an embodiment of the invention, a 1 mil film will have a machine direction (MD) secant modulus at 1% strain of from 160 MPa to 250 MPa. In another embodiment of the invention, a 1 mil film will have a machine direction (MD) secant modulus at 1% strain of from 170 MPa to 250 MPa. In yet another embodiment of the invention, a 1 mil film will have a machine direction (MD) secant modulus at 1% strain of from 140 MPa to 230 MPa. In yet another embodiment of the invention, a 1 mil film will have a machine direction (MD) secant modulus at 1% strain of from 180 MPa to 280 MPa. In yet another embodiment of the invention, a 1 mil film will have a machine direction (MD) secant modulus at 1% strain of from 190 MPa to 280 MPa. In yet another embodiment of the invention, a 1 mil film will have a machine direction (MD) secant modulus at 1% strain of from 180 MPa to 260 MPa.

In an embodiment of the invention, a 1 mil film will have a transverse direction (TD) secant modulus at 1% strain of ≥170 MPa, or ≥180 MPa, or ≥190 MPa, or ≥200 MPa, or ≥210 MPa, or ≥220 MPa or ≥230 Mpa, or ≥240 Mpa, or ≥250 Mpa. In an embodiment of the invention, a 1 mil film will have a transverse direction (TD) secant modulus at 1% strain of from 170 MPa to 310 MPa. In an embodiment of the invention, a 1 mil film will have a transverse direction (TD) secant modulus at 1% strain of from 170 MPa to 300 MPa. In an embodiment of the invention, a 1 mil film will have a transverse direction (TD) secant modulus at 1% strain of from 170 MPa to 290 MPa. In an embodiment of the invention, a 1 mil film will have a transverse direction (TD) secant modulus at 1% strain of from 170 MPa to 280 MPa. In another embodiment of the invention, a 1 mil film will have a transverse direction (TD) secant modulus at 1% strain of from 180 MPa to 300 MPa. In another embodiment of the invention, a 1 mil film will have a transverse direction (TD) secant modulus at 1% strain of from 180 MPa to 290 MPa. In yet another embodiment of the invention, a 1 mil film will have a transverse direction (TD) secant modulus at 1% strain of from 190 MPa to 300 MPa. In another embodiment of the invention, a 1 mil film will have a transverse direction (TD) secant modulus at 1% strain of from 190 MPa to 290 MPa. In another embodiment of the invention, a 1 mil film will have a transverse direction (TD) secant modulus at 1% strain of from 200 MPa to 290 MPa.

In embodiments of the invention, a 1 mil film will have a haze value of less than 20%, or less than 15%, or s 15%, ors 12.5%, ors 10%, or from 3 to 25%, or from 5 to 20%, or from 5 to 27%, or from 5% to 25%, or from 3 to 15%, or from 5 to 15%.

In embodiments of the invention, a 1 mil film will have a gloss at 45° value of greater than 30, or ≥35, or ≥40 or ≥45, or ≥50, or ≥55, or from 30 to 60, or from 32 to 60, or from 32 to 55, or from 32 to 50, or from 32 to 45.

The film or film layer may, by way of non-limiting example only, have a total thickness ranging from 0.5 mils to 4 mils (note: 1 mil=0.0254 mm), which will depend on for example the die gap employed during film casting or film blowing.

The above description applies to monolayer films. However, the film of the current invention may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The film of the current invention may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film (for example, as used in the production of produce packaging). The phrase "sealant layer" refers to a film that is involved in the sealing of the film to itself or to another layer in a multilayer film. A "tie layer" refers to any internal layer that adheres two layers to one another.

By way of example only, the thickness of the multilayer films can be from about 0.5 mil to about 10 mil total thickness.

The films can be used for heavy duty bags, shrink film, agricultural film, garbage bags and shopping bags. The films can be produced by blow extrusion, cast extrusion, co-extrusion and be incorporated also in laminated structures.

EXAMPLES

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v15, p. 1518 or used directly after being stored over activated 4 Å molecular sieves. The methylaluminoxane used was a 10% MAO solution in toluene supplied by Albemarle which was used as received.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("$M_n$") and 5.0% for the weight average molecular weight ("$M_w$"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method (e.g. ASTM-D6474-99).

The melting points, including peak melting point ($T_m$) and percent of crystallinity of the polymers were determined by using a TA Instrument DSC Q1000 Thermal Analyzer at 10° C./min. In a DSC measurement, a heating-cooling-heating cycle from room temperature to 200° C. or vice versa was applied to the polymers to minimize the thermo-mechanical history associated with them. The melting point and percent of crystallinity were determined by the primary peak temperature and the total area under the DSC curve respectively from the second heating data. The peak melting temperature $T_m$ is the higher temperature peak, when two peaks are presented in a bimodal DSC profile (typically also having the greatest peak height).

The determination of branch frequency as a function of molecular weight (and hence the comonomer distribution profile) was carried out using high temperature Gel Permeation Chromatography (GPC) and FT-IR of the eluent. Polyethylene standards with a known branch content, polystyrene and hydrocarbons with a known molecular weight were used for calibration.

The short chain branch frequency (SCB per 1000 carbon atoms) and hence the comonomer content (in weight percent) of copolymer samples was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Melt indexes, $I_2$, $I_5$, and $I_{21}$, for the polyethylene composition were measured according to ASTM D1238 (when conducted at 190° C., using a 2.16 kg, a 5 kg and a 21 kg weight respectively). Melt index, $I_{10}$, was determined in accordance with ASTM D1238 condition F at 190° C. with a 10 kilogram weight.

Polyethylene composition density (g/cm$^3$) was measured according to ASTM D792.

Polyethylene bulk density (reported as lb/ft$^3$) was measured in general accordance with ASTM D1895-96 (2003).

Hexane extractables using compression molded plaques were determined according to ASTM D5227.

To determine CDBI, a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI is determined by establishing the weight percentage of a copolymer sample that has a comonomer content within 50% of the median comonomer content on each side of the median (See U.S. Pat. No. 5,376,439).

The specific temperature rising elution fractionation (TREF) method used herein was as follows. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedures described above are well known to persons skilled in the art and can be used to determine the modality of a TREF profile, a CDBI$_{50}$, a copolymer wt % eluting at or below 40° C., a copolymer wt % eluting at above 100° C., a copolymer wt % eluting at from 90° C. to 105° C., a T(75)–T(25) value, as well as the temperatures or temperature ranges where elution intensity maxima (elution peaks) occur.

The melt strength of a polymer is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min$^2$ or 65±15 m/min$^2$. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Dynamic Mechanical Analysis (DMA). Rheological measurements (e.g. small-strain (10%) oscillatory shear measurements) were carried out on a dynamic Rheometrics SR5 Stress rotational rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G''), phase angle (δ), complex modulus (G*) and complex viscosity (η*).

The complex viscosity $|\eta^*(\omega)|$ versus frequency (ω) data were then curve fitted using the modified three parameter Carreau-Yasuda (CY) empirical model to obtain the zero shear viscosity ηo, characteristic viscous relaxation time $\tau_\eta$, and the breadth of rheology parameter-a. The simplified Carreau-Yasuda (CY) empirical model used is as follows:

$$|\eta^*(\omega)| = \eta_0 / [1 + (\tau_\eta \omega)^a]^{(1-n)/a}$$

wherein: $|\eta^*(\omega)|$=magnitude of complex shear viscosity; $\eta_0$=zero shear viscosity; $\tau_\eta$=characteristic relaxation time; a="breadth" of rheology parameter (which is also called the "Carreau-Yasuda shear exponent" or the "CY a-parameter" or simply the "a-parameter" in the current invention); n=fixes the final power law slope, fixed at 2/11; and ω=angular frequency of oscillatory shearing deformation. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics,* 2nd Edition, John Wiley & Sons (1987); each of which is incorporated herein by reference in its entirety.

The Shear Thinning Index (SHI) was determined according to the method provided in U.S. Pat. Appl. No. 2011/0212315: the SHI is defined as SHI(ω)=η*(ω)/η$_0$ for any given frequency (ω) for dynamic viscosity measurement, wherein η$_0$ is zero shear viscosity @190° C. determined via the empiric Cox-Merz-rule. η* is the complex viscosity @190° C. determinable upon dynamic (sinusoidal) shearing or deformation of a copolymer as determined on a Rheometrics SR5 Stress rotational rheometer using parallel-plate geometry. According to the Cox-Merz-Rule, when the frequency (ω) is expressed in Radiant units, at low shear rates, the numerical value of η* is equal to that of conventional, intrinsic viscosity based on low shear capillary measurements. The skilled person in the field of rheology is well versed with determining η° in this way.

The films of the current examples were made on a blown film line manufactured by Battenfeld Gloucester Engineering Company of Gloucester, Mass. using a die diameter of 4 inches, and a die gap of 35 mil or 50 mil. 3% of Ingenia 1150 PPA masterbatch was added to sample 1* and sample 5* in film blowing. Analysis of ethylene copolymer 6* shows that about 250 ppm of fluoroelastomer type PPA is present. This blown film line has a standard output of more than 100 pounds per hour and is equipped with a 50 horsepower motor. Screw speed was 35 to 50 RPM. The screw has a length/diameter (L/D) ratio of 24/1. Melt Temperature and Frost Line Height (FLH) are 430 to 440° F. and 16 inches respectively. The blown film bubble is air cooled. Typical blow up ratio (BUR) for blown films prepared on this line are from 1.5/1 to 4/1. An annular die having a gap of 35 mils was used for these experiments. The films of this example were prepared using a BUR aiming point of 2.5:1 and a film thickness aiming point of 1.0 mils.

The haze (%) was measured in accordance with the procedures specified in ASTM D 1003-07, using a BYK-Gardner Haze Meter (Model Haze-gard plus).

Dart impact strength was measured on a dart impact tester (Model D2085AB/P) made by Kayeness Inc. in accordance with ASTM D-1709-04 (method A).

Machine (MD) and transverse (TD) direction Elmendorf tear strengths were measured on a ProTear™ Tear Tester made by Thwing-Albert Instrument Co. in accordance with ASTM D-1922.

TEF & Lube Puncture resistance was measured on a MTS Universal Tester (Model SMT(HIGH)-500N-192) using a round Teflon-coated probe of 0.75 inch diameter at a rate of 20 in/min. In the test, a film sample of 4.25×4.25 square inches was clamped in the holder and then approximately 1 cm$^3$ of lube was applied to the center of film. The puncture energy at break was determined from the area under the real-time load-displacement curve.

Puncture resistance of polyethylene film was also tested at a standard rate of 10 inch/min using a 0.75 inch diameter pear-shaped TFE-fluorocarbon coated probe on a MTS Universal Tester following ASTM D5748. MTS Testworks 4 software was used to analyze the puncture data where the maximum puncture force, elongation at break and total puncture energy at break were measured from the force-displacement curve.

MD or TD secant modulus was measured on an Instrument 5-Head Universal Tester (Model TTC-102) at a crosshead speed of 0.2 in/min up to 10% strain in accordance with ASTM D-882-10. The MD or TD secant modulus was determined by an initial slope of the stress-strain curve from an origin to 1% strain.

Film tensile testing was conducted on an Instrument 5-Head Universal Tester (Model TTC-102) in accordance with ASTM D-882-10.

Gloss was measured on a BYK-Gardner 45° Micro-Gloss unit in accordance with ASTM D2457-03.

A seal was prepared by clamping two 2.0 mil film strips between heated upper and lower seal bars on a SL-5 Sealer made by Lako Tool for 0.5 seconds, 40 psi seal bar clamping pressure for each temperature in the range from onset of seal to melt through. Seal strength or sealability parameter was measured as a function of seal temperature on an Instrument 5-Head Universal Tester (Model TTC-102) in accordance with ASTM F88-09.

Instrumented drop weight impact testing was conducted on Dynatup Model 9250 impact tester on the film samples of 5×5 square inches at an impact velocity of 10.9 ft/s and ambient temperature following ASTM D7192. The maximum impact load, total impact energy and energy at the maximum impact load were determined from the impact load-displacement curve using Dynatup Impulse Data Acquisition System software.

Puncture resistance was measured on a MTS Universal Tester using a 0.75 inch diameter pear-shaped TFE-fluorocarbon coated probe at a rate of 10 inch/min. in accordance with ASTM D5748. The maximum puncture force, elongation at break and total puncture energy were determined from the load-displacement curve using MTS Testworks version 4.11 software.

Catalyst Synthesis

General

All reactions involving air- and or moisture-sensitive compounds were conducted under nitrogen using standard Schlenk techniques, or in a glovebox. Toluene (EMD; Dri-Solv) and pentane (Sigma-Aldrich; anhydrous) were purified using the system described by Pangborn et. al. in *Organometallics* 1996, v15, p. 1518 and stored over activated 4 Å sieves (calcined at 360° C. for at least 18 hours). Titanium(IV) tetrachloride and n-butyllithium (1.6 M solution in hexanes) were purchased from Sigma-Aldrich, and were used without further purification. 2,3,4,5,6-Pentafluorobenzyl bromide was purchased from Oakwood products without further purification. Indene and titanium(IV) ethoxide were purchased from Sigma-Aldrich and purified by procedures outlined in this document. Diisopropylamine was purchased from Sigma-Aldrich and stored over activated 4 Å molecular sieves. Deuterated solvents were purchased from Sigma-Aldrich (toluene-d$_8$, dichloromethane-d$_2$, tetrahydrofuran-d$_8$) and were stored over activated 4 Å molecular sieves. NMR spectra were recorded on a Bruker spectrometer (400.1 MHz for $^1$H, 162 MHz for $^{31}$P, 376 MHz for $^{19}$F). Technical grade indene (223 g, 1.74 mol, >90% pure by GC) was distilled (controlled dynamic vacuum of 500 mTorr; heating bath temperature of 60° C.) and stored in a glovebox.

Synthesis of (1-(C$_6$F$_5$CH$_2$)Ind)(t-Bu$_3$PN)TiCl$_2$

To a toluene solution (600 mL) of indene (19.60 g, 169.0 mmol) was at room temperature was added n-butyllithium (1.6 M solution in hexanes; 105 mL, 168.0 mmol, 1.0 equiv) dropwise via dropping funnel. The reaction mixture was stirred at room temperature for 3 h, and 2,3,4,5,6-pentafluorobenzyl bromide (44.04 g, 8.9 mmol, 0.9 equiv) was added dropwise while maintaining a temperature of 50° C. The reaction mixture was stirred for 2 h at 50° C. and then for a further 18 h at ambient temperature. The slurry was filtered, and the pale yellow filtrate was concentrated under vacuum down to yield the product as a pinkish off-white powder (47.20 g, 141.9 mmol, 84% yield, 89% purity by GCMS).

A solution of dry ethanol (dried with NaOEt and distilled; 8.25 g; 179.07 mmol) in toluene (approximately 50 mL in a vial) was slowly added to a toluene solution (100 mL) of TiCl$_4$ (33.97 g; 179.07 mmol) at ambient temperature via cannula. The rate of addition was maintained so that the reaction was under control and the HCl was vented to a bubbler. The reaction was heated to 100° C. for 45 minutes. The color of the solution changed from red to light orange. In a glove box, solid t-Bu$_3$PNSiMe$_3$ was added over 20 minutes in batches to the above solution of TiCl$_3$(OEt) at ambient temperature. The resulting dark red solution was stirred for about 18 hours at 110° C. The reaction mixture was cooled to ambient temperature then cooled to 0° C. for 3 hours and then filtered through a medium pore frit. The solid was washed with a 1:1 mixture of toluene/heptane (2×30 mL), then pentane (30 mL), and then dried under vacuum to yield the expected product, (t-Bu$_3$PN)TiCl$_3$, as a free flowing pale yellow to tan solid (57 g; 154 mmol; 86%) with >95% purity by NMR. $^1$H NMR (toluene-cis): δ 1.11 (d, J=14 Hz). $^{31}$P{$^1$H} NMR (toluene-d$_8$): δ 55.3 (s) versus H$_3$PO$_4$/D$_2$O at 0 ppm.

A hexane solution of n-BuLi (1.6 M; 32 mmol; 20 mL) was added to a pentane solution (150 ml) of diisopropylamine (32 mmol; 3.24 g) at ambient temperature. After stirring for 1 hour, the resulting clear solution was concentrated under vacuum until the formation of solid product was observed. Removal of the solvent was stopped at that point and crystallization was allowed to proceed for 3 hours. The solid lithium diisopropylamide (LDA) was isolated by filtration, washed with pentane, then dried under vacuum (2.8 g; 26 mmol; 81%).

To a toluene slurry (50 mL) of solid LDA (1.19 g; 11 mmol) was added a toluene solution (40 mL) of 1-(C$_6$F$_5$CH$_2$)Ind (3.28 g, 11 mmol). The reaction solution was stirred at ambient temperature for 3 hours and then added slowly to a toluene solution (50 mL) of t-Bu$_3$PNTiCl$_3$ (4.10 g, 11 mmol) over 20 minutes. The reaction mixture was stirred at ambient temperature overnight (~18 h). The reaction mixture was allowed to settle and the supernatant was decanted. The remaining solid was dissolved in CH$_2$Cl$_2$ (30 mL) and the slurry was filtered through a medium pore frit. The combined toluene and CH$_2$Cl$_2$ filtrates were concentrated to remove the CH$_2$Cl$_2$ and most of the toluene down to a volume of approximately 25 mL and the slurry was left for 18 hours at ambient temperature. The slurry was filtered through a medium pore frit and the solid was washed with a 1:1 mixture of toluene and heptane (2×20 mL) and then pentane (20 ml). The desired product, (1-(C$_6$F$_5$CH$_2$)Ind)(t-Bu$_3$PN)TiCl$_2$, was isolated as a bright orange-yellow crystalline solid (6.09 g; 9.7 mmol; 88%) in >95% purity (NMR). $^1$H NMR (toluene-cis): δ 7.96 (m, 1H), 7.61 (m, 1H), 7.15 (m, 2H), 6.89 (m, 1H), 6.50 (m, 1H), 4.57 (dm, J=15.2 Hz, 1H), 4.09 (dm, J=15.2 Hz, 1H), 1.21 (d, J=13.6 Hz, 27H). $^{19}$F NMR (toluene-cis): δ −145.2 (m, 2F), −159.6 (t, J=22.6 Hz, 1F), −164.5 (m, 2F). $^{31}$P{$^1$H} NMR (toluene-d$_8$): δ 45.9 (s) versus H$_3$PO$_4$/D$_2$O at 0 ppm.

Catalyst 1:

Raw Sylopol™ 2408 silica (Grace Davison) was dehydrated ("calcined") by heating the silica under a flow of nitrogen (~0.4 slpm) from ambient temperature up to 600° C. over 8 hours (ramp rate of 1.2° C./min), holding at 600° C. for 4 hours, and then cooling back to ambient temperature under nitrogen flow. To a slurry of the calcined silica (75.35 g; 0.84 mmol OH/g silica) in anhydrous heptane (400 mL) was added a solution of AlEt$_3$ (TEAL) in hexane (14.28 g of 25 wt % solution, 31.3 mmol) dropwise over 5 minutes using a dropping funnel with overhead mechanical stirring (about 260 rpm) and the resulting slurry was stirred for 30 minutes. A heptane solution (15 mL) of butylethylmagnesium (29.02 g of 20 wt % solution, 52.5 mmol) was then added dropwise by dropping funnel and the slurry was stirred for 2 hours. A solution of tert-butylchloride (9.72 g, 105 mmol) in anhydrous heptane (10 mL) was then added dropwise via syringe to the slurry over a period of 7 min and the temperature of the slurry rose from 27 to 44° C. at the end of the addition. After stirring for 2 hours, the slurry was filtered through a medium porosity glass frit and washed with two portions of heptane (2×200 mL portions). The washed solid support was reslurried in toluene (450 mL) with mechanical stirring at about 250 rpm and a toluene solution of methylaluminoxane (152.68 g of 10 wt % MAO; Albemarle) was added dropwise by pipette over 5 minutes and the resulting slurry was stirred for 1 hour. Solid (1-(C$_6$F$_5$CH$_2$)Ind)(t-Bu$_3$PN)TiCl$_2$ (1.76 g; 2.8 mmol) was added in portions over 5 minutes and the slurry was stirred for an additional 2 hours. The slurry was then filtered through a medium-pore frit and the solid was washed with toluene (200 mL), then pentane (2×200 mL portions) and dried under vacuum (to <400 mTorr). The expected catalyst composition is shown in Table 1.

Catalyst 2:

To a pentane slurry (230 mL) of the catalyst described in Example 1 (49.0 g) was added a toluene solution of Armostat™ 1800 (8.367 g of a 15 wt % solution in toluene) over 2 minutes with stirring at about 250 rpm. The slurry was stirred for 30 minutes and then filtered through a medium pore frit and the solid was washed with pentane (3×100 mL portions) and dried under vacuum (to <400 mTorr). The expected catalyst composition is shown in Table 1.

Catalyst 3:

To a slurry of the calcined Sylopol™ 2408 silica (39.12 g; 0.84 mmol OH/g silica) in anhydrous heptane (200 mL) was added a solution of AlEt$_3$ (TEAL) in hexane (7.41 g of 25 wt % solution, 16.2 mmol) dropwise over 5 minutes using a dropping funnel with overhead mechanical stirring (about 260 rpm) and the resulting slurry was stirred for 30 minutes. A heptane solution (15 mL) of butylethylmagnesium (5.80 g of 20 wt % solution, 10.5 mmol) was then added dropwise by dropping funnel and the slurry was stirred for 2 hours. A solution of tert-butylchloride (1.95 g, 21.1 mmol) in anhydrous heptane (10 mL) was then added dropwise via syringe to the slurry over a period of 7 min and the temperature of the slurry rose from 27 to 33° C. at the end of the addition. After stirring for 2 hours, the slurry was filtered through a medium porosity glass frit and washed with two portions of heptane (2×100 mL portions). The washed solid support was reslurried in toluene (225 mL) with mechanical stirring at about 250 rpm and a toluene solution of methylaluminoxane (76.34 g of 10 wt % MAO; Albemarle) was added dropwise by pipette over 5 minutes and the resulting slurry was stirred for 1 hour. Solid (1-(C$_6$F$_5$CH$_2$)Ind)(t-Bu$_3$PN)TiCl$_2$ (0.88 g; 1.4 mmol) was added in portions over 3 minutes and the slurry was stirred for an additional 2 hours. The slurry was then filtered through a medium-pore frit and the solid was washed with toluene (100 mL), then pentane (2×100 mL portions) and dried under vacuum (to <400 mTorr). The expected catalyst composition is shown in Table 1.

Catalyst 4:

To a slurry of the calcined Sylopol™ 2408 silica (39.12 g; 0.84 mmol OH/g silica) in anhydrous pentane (200 mL) was added a solution of AlEt$_3$ (TEAL) in hexane (7.41 g of 25 wt % solution, 16.2 mmol) dropwise over 5 minutes using a dropping funnel with overhead mechanical stirring (about 260 rpm) and the resulting slurry was stirred for 30 minutes. A heptane solution of butylethylmagnesium (5.81 g of 20 wt % solution; 10.5 mmol) was then added dropwise by dropping funnel and the slurry was stirred for 2 hours. A solution of tert-butylchloride (1.94 g, 21.0 mmol) in anhydrous heptane (10 mL) was then added dropwise via syringe to the slurry over a period of 9 min and the temperature of the slurry rose from 27 to 30° C. at the end of the addition. After stirring for 2 hours, the slurry was filtered through a medium porosity glass frit and washed with two portions of pentane (2×100 mL portions). The washed solid support was reslurried in pentane (225 mL) with mechanical stirring at about 250 rpm and a toluene solution of methylaluminoxane (76.34 g of 10 wt % MAO; Albemarle) was added dropwise by pipette over 5 minutes and the resulting slurry was stirred for 1 hour. Solid (1-($C_6F_5CH_2$)Ind)(t-$Bu_3$PN)$TiCl_2$ (0.88 g; 1.4 mmol) was added in portions over 3 minutes and the slurry was stirred for an additional 2 hours. The slurry was then filtered through a medium-pore frit and the solid was washed with pentane (3×100 mL portions) and dried under vacuum (to <400 mTorr). The expected catalyst composition is shown in Table 1. Note that relative to catalyst 3, the synthetic sequence for catalyst 4 employs pentane in certain addition and washing steps.

Catalyst 5, Comparative:

To a slurry of the calcined Sylopol™ 2408 silica (399.0 g; 0.84 mmol OH/g silica) in anhydrous toluene (1.5 L) stirred at about 250 rpm was added a solution of methylaluminoxane (844.6 g of 10 wt % MAO; Albemarle) at a rate of 35 mL/min using a dropping funnel. The resulting slurry was stirred for 2 hours. Solid (1-($C_6F_5CH_2$)Ind)(t-$Bu_3$PN)$TiCl_2$ (8.82 g; 14.0 mmol) was added at a rate of about 0.35 g/min using a powder addition funnel. The slurry was stirred for 2 hours. A toluene solution (60 mL) of Armostat™ 1800 (12.57 g) was then added to slurry at a rate of about 10 mL/min and the slurry was stirred for 30 minutes. Stirring was stopped and the clear supernatant (about 2 L) was removed by decantation and the supported catalyst was reslurried in anhydrous toluene (700 mL) and stirred for 30 minutes. The stirring was stopped and about 700 mL of supernatant was removed by decantation. Anhydrous pentane (750 mL) was added and stirring was resumed for 30 minutes. Stirring was stopped and about 700 mL of supernatant was removed by decantation. The solid catalyst was washed and decanted once more in this way using 750 mL of pentane. The solid was dried under vacuum to <400 mTorr at ambient temperature. The expected catalyst composition is shown in Table 1.

Reactor (TSR) in continuous gas phase operation. Ethylene polymerizations were run at 80° C. with a total operating pressure of 300 pounds per square inch gauge (psig). Gas phase compositions for ethylene and 1-hexene were controlled via closed-loop process control to values of 50.0 and 0.34-0.62 mole %, respectively, for inventive catalysts, and 58.0 and 0.67 mole %, respectively, for the comparative catalyst. Hydrogen was metered into the reactor in molar feed ratios in the range of 0.0008-0.0013 relative to ethylene feed during polymerization. Nitrogen constituted the remainder of the gas phase mixture. Typical production rate for these conditions is 2.0 to 3.0 kg of polyethylene per hour.

The catalyst metering device used for administering catalyst to the reactor is equipped with a probe that measures electrostatic charge carried by the solid material passing through a monitored tube leading catalyst to the reactor.

Pelletization of Granular Resins: 500 ppm of Irganox 1076 and 1000 ppm of Irgafos 168 were dry blended with the granular resin prior to pelletization. The resulting powder blend was extruded on Leistritz twin-screw extruder with a screw diameter of 38 mm and L/D ratio of 33/1 under nitrogen atmosphere to minimize polymer degradation. The pelletization conditions of the extruder were set at a melt temperature of 210° C. an output rate of 15 to 20 lb/hr, a screw speed of 120 rpm and a pelletizer speed of 30 to 40 rpm. The pelleted resin was cooled and then collected for the resin characterization and film evaluation.

Continuous polymerization results and conditions are shown in Table 2. Polymer properties are shown in Table 3. Inventive polymerizations are polymerization runs 1, 2, 3, and 4 which employ catalysts 1, 2, 3, and 4 respectively to make ethylene copolymers 1-4 respectively. Comparative polymerization run 5 employed comparative catalyst 5 to make ethylene copolymer 5, which is comparative. For further comparison purposes a polymer which is believed to be a resin representative of Enable™ 20-05 (which is commercially available from ExxonMobil) has been included in Table 3 as ethylene polymer 6, which is comparative.

TABLE 1

Catalyst Compositions

| Catalyst No. | Ti (mmol Ti/g cat) | Ti (wt % Ti) | Al from MAO (wt %) | Al from MAO)/Ti (molar ratio) | Al from TEAL (wt %) | Total Al (wt %) | Total Al/Ti (molar ratio) | $MgCl_2$ (wt %) | silica (wt % $SiO_2$) | Armostat™ 1800 (wt %) |
|---|---|---|---|---|---|---|---|---|---|---|
| 1 | 0.028 | 0.13% | 7.0% | 94 | 0.84% | 7.9% | 105 | 5.0% | 75% | — |
| 2 | 0.027 | 0.13% | 6.9% | 92 | 0.81% | 7.7% | 102 | 4.8% | 73% | 2.5 |
| 3 | 0.028 | 0.13% | 7.0% | 94 | 0.87% | 7.9% | 106 | 2.0% | 78% | — |
| 4 | 0.028 | 0.13% | 7.0% | 94 | 0.87% | 7.9% | 106 | 2.0% | 78% | — |
| 5, Comp. | 0.028 | 0.13% | 7.8% | 104 | — | 7.8% | 104 | — | 79% | 2.5 |

Polymerization

Polymerization Run Numbers 1-5 (Continuous Ethylene/1-Hexene Copolymerization):

Continuous ethylene/1-hexene gas phase copolymerization experiments were conducted in a 56.4 L Technical Scale

TABLE 2

Ethylene/1-Hexene Copolymerization in Continuous Reactor[1]

| Poly. Run No. | Reactor temp. (° C.) | C2 partial pressure (psig) | C2 (% by GC) | iC5 (% by GC) | C6/C2 molar ratio | H2/C2 molar ratio | Prod. rate (kg polymer/hr) | Productivity[2] (g polymer/g cat) | Bulk Density (lb/ft³) | Avg. particle size (mm) |
|---|---|---|---|---|---|---|---|---|---|---|
| 1 | 80 | 157 | 50 | 11.4 | 0.0167 | 0.00102 | 2.3 | 2680 | 32 | 0.538 |
| 2 | 80 | 157 | 50 | 11.5 | 0.0167 | 0.00102 | 2.3 | 2870 | 28 | 0.624 |
| 3 | 80 | 157 | 50 | 10.9 | 0.0168 | 0.00081 | 2.4 | 2300 | 29 | 0.563 |

TABLE 2-continued

Ethylene/1-Hexene Copolymerization in Continuous Reactor[1]

| Poly. Run No. | Reactor temp. (° C.) | C2 partial pressure (psig) | C2 (% by GC) | iC5 (% by GC) | C6/C2 molar ratio | H2/C2 molar ratio | Prod. rate (kg polymer/hr) | Productivity[2] (g polymer/g cat) | Bulk Density (lb/ft$^3$) | Avg. particle size (mm) |
|---|---|---|---|---|---|---|---|---|---|---|
| 4 | 80 | 157 | 50 | 10.8 | 0.0167 | 0.00096 | 2.5 | 2870 | 25 | 0.572 |
| 5, comp. | 80 | 181 | 58 | 10.8 | 0.0232 | 0.00130 | 2.4 | 2060 | 22 | 0.565 |

Note
[1]C6 = 1-hexene, C2 = ethylene; iC5 = isopentane; H2 = hydrogen; GC = gas chromatography Note
[2]"Productivity" is an average of catalyst productivities calculated from residual Ti, Al, and Si in the polymers as determined by neutron activation analysis.

TABLE 3

Polymer Properties

| | Polymerization Run No. | | | | | |
|---|---|---|---|---|---|---|
| | 1 | 2 | 3 | 4 | 5 | NA |
| Ethylene Copolymer | 1 | 2 | 3 | 4 | 5, Comp. | 6, Comp. |
| density (g/cc) | 0.9212 | 0.9218 | 0.9219 | 0.9215 | 0.9212 | 0.9203 |
| MI, $I_2$ (g/10 min) | 0.58 | 0.47 | 0.50 | 0.69 | 0.45 | 0.47 |
| MFR, $I_{21}/I_2$ | 33.8 | 36.1 | 31.5 | 30.0 | 43.3 | 41.2 |
| $I_{10}/I_2$ | 9.7 | 9.9 | 8.9 | 8.7 | 10.4 | 10.8 |
| TREF profile | bimodal T(low) = 84.3° C. T(high) = 92.6° C. | bimodal T(low) = 81.7° C. T(high) = 93.0° C. | bimodal T(low) = 83.6° C. T(high) = 92.9° C. | bimodal T(low) = 83.3° C. T(high) = 93.1° C. | multimodal T(low) = 72.7° C. T(high) = 93.3° C. | single peak at T = 81.5° C. |
| T(high) − T(low), ° C. | 8.3 | 11.3 | 9.3 | 9.8 | 20.6 | NA |
| wt % at 90-105° C. | 10.0 | 11.5 | 17.6 | 13.1 | 9.9 | 0.6 |
| T(75)-T(25) (° C.) | 11.7 | 8.6 | 13.0 | 11.6 | 14.5 | 4.8 |
| CDBI$_{50}$ (wt %) | 64.5 | 69.7 | 58.2 | 63.0 | 65.6 | 86.8 |
| GPC-FTIR comonomer profile | slightly reversed | reversed | reversed | reversed | highly reversed | approx. flat |
| DSC melt temp (° C.) | 112.1, 119.0 | 111.0, 119.6 | 112.5, 121.0 | 112.2, 120.3 | 105.3, 120.8 | 111.7 |
| % crystallinity | 48.5 | 49.3 | 48.0 | 48.4 | 46.2 | 43.8 |
| CY a-parameter | 0.11 | 0.14 | 0.18 | 0.16 | 0.22 | 0.0616 |
| $M_n$ | 36200 | 27800 | 41000 | 35000 | 21308 | 31400 |
| $M_w$ | 111300 | 117000 | 127000 | 113800 | 126824 | 96000 |
| $M_z$ | 246400 | 280100 | 308400 | 262800 | 367180 | 193000 |
| $M_w/M_n$ | 3.07 | 4.21 | 3.10 | 3.26 | 5.95 | 3.05 |
| $M_z/M_w$ | 2.21 | 2.39 | 2.43 | 2.31 | 2.9 | 2.0 |
| $C_6$ content (wt %) | 6.0 | 5.8 | 6.0 | 6.0 | 7.1 | 6.5 |
| SCB/1000 C | 10.3 | 10.1 | 10.5 | 10.5 | 12.3 | 11.3 |
| hexane extractables (wt %) | 0.47 | 0.44 | 0.37 | 0.44 | 0.79 | 0.39 |
| melt strength (cN) | 5.7 | 6.3 | 7.2 | 5.2 | 6.7 | 5.93 |
| VGP crossover phase angle ($\delta^{x\circ}$) | 58.8 | 58.2 | 63.2 | 63.9 | 60.5 | 54.3 |
| SCB/1000 C at MW of 200,000-SCB/1000 C at MW of 50,000 | 0.3 | 2.3 | 2.3 | 2.4 | 6.9 | 0.2 (or <0) |
| Shear Thinning Index (SHI) | 0.04 | 0.08 | 0.25 | 0.21 | 0.15 | <0.01 |

Tables 1 and 2, show that catalysts 1-4 (which involve immobilization of a phosphinimine catalyst on a passivated support) have productivities which are higher than catalyst 5 (which is comparative and involves immobilization of a phosphinimine catalyst on a non-passivated support) even when a lower amount of methylaluminoxane (MAO) co-catalyst was employed for the catalysts 1-4. The same is also true despite polymerization runs 1-4 operating in the presence of lower ethylene partial pressure than polymerization run 5.

A comparison of polymerization runs 1 and 2, in which the catalysts used are on a passivated support shows polymerization data that is essentially the same for when an Armostat™ 1800 catalyst modifier is included or not included in the polymerization catalyst (see Tables 1 and 2). The polymers are similar as well, except that when Armostat™ 1800 is present in the polymerization catalyst, the polydisperisty index, $M_w/M_n$ as well as the MFR ($I_{21}/I_2$) are increased (see Table 3).

The data in Table 2 show that the catalysts 1-4 have increased comonomer response compared to comparative catalyst 5 at a temperature of 80° C. That is, when using catalysts 1-4, the amount of 1-hexene required to reach a certain density (e.g. ca. 0.922 g/cc) is lower relative to the amount required when using comparative catalyst 5: compare Poly. Run Nos 1-4 which require a C6/C2 molar ratio of 0.0167 or 0.0168 to poly. run no. 5 which requires a C6/C2 molar ratio of 0.0232 respectively. A decrease in the amount of comonomer being fed to a reactor to generate a polymer with a given density may be advantageous from an economic viewpoint.

Also significant is that the bulk density of the polymer made with catalysts formulated with a passivated support is higher than the bulk density of the polymer made with catalysts formulated with an un-treated support (See Table 2). Compare the bulk density of the polymer obtained in Polymerization Run Nos 1 to 4 (using catalysts 1-4, respectively) which provide polymer bulk densities of from 25 to 32 lb/ft$^3$ with the bulk density of the polymer obtained in Polymerization Run No. 5 (using comp. catalyst 5), which is 22.0 lb/ft$^3$. An increase in the bulk density of the polymer being formed may allow for an increase in the polymer production rate per unit of reactor volume and improves polymer storage capacity.

All the ethylene copolymers are produced under similar polymerization conditions. A person skilled in the art will recognize from the data provided in Table 3, that the ethylene/1-hexene copolymers obtained using a phosphinimine single site catalyst immobilized on a passivated support have somewhat more uniform comonomer distributions relative to an ethylene/1-hexene copolymer obtained using a phosphinimine catalyst immobilized on a traditional (i.e. non-passivated) support. This is reflected in the similar or slightly higher CDBI$_{50}$ values but also in the GPC-FTIR data which shows that the comonomer incorporation profile is flatter for catalysts on a passivated support. The values for SCB/1000 C at MW of 200,000–SCB at MW of 50,000 are also reduced when the phosphinimine catalyst is immobilized on a passivated support relative to when an untreated support is used: compare polymers 1-4 which have a value of from 0.3 to 2.4 with comp. polymer 5 which has a value of 6.9.

In addition, and with reference to Table 3, all the copolymers made with catalysts 1-4 show narrower molecular weight distributions (e.g. M$_w$/M$_n$ range of 3.07 to 4.21) relative to comp. catalyst 5 which has a M$_w$/M$_n$ of 5.95. This is especially true where the ethylene copolymers are made using a catalyst on a passivated support but not treated with Armostat-1800: see ethylene copolymers 1, 3 and 4 which have M$_w$/M$_n$ values of 3.07, 3.10 and 3.26 respectively. These more narrow compositions are also born out in the melt flow ratio (MFR) data, I$_{21}$/I$_2$ which is smaller (e.g. in the range of 30 to 36) for catalysts 1-4, and higher (e.g. 43) for comp. catalyst 5. The smaller CY-a parameter observed for products made with catalysts 1-4 (e.g. in the range of from 0.11 to 0.18), compared to the product made with catalyst 5 (e.g. 0.22), is also indicative of better melt rheology behavior. That is, the lower the CY-a parameter, the better the shear thinning behavior of the copolymer generally is.

As shown in Table 3, the polymers made using catalysts 1-4 all show lower hexane extractables (ranging from 0.37 to 0.47) than polymer made with comp. catalyst 5, which may improve organoleptic and other properties.

Each of the ethylene copolymers 1-4 have a unimodal molecular weight distribution as shown in FIG. 1.

Figure 2A:
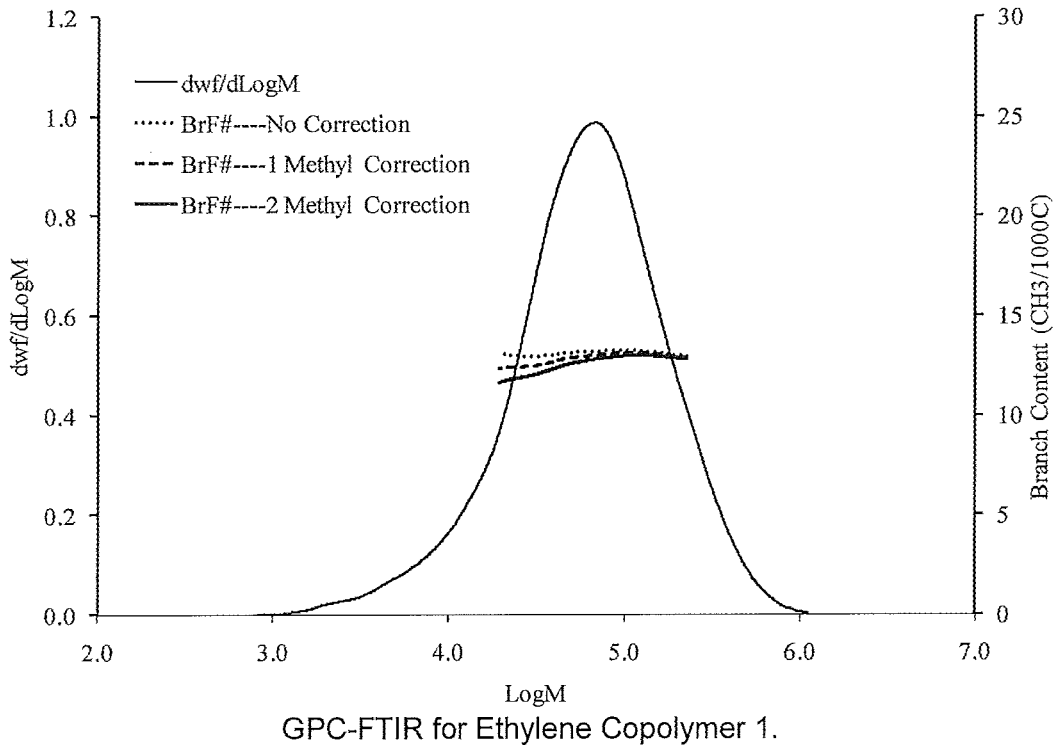
FIG. 2A shows a gel permeation chromatograph with Fourier transform infrared (GPC-FTIR) detection obtained for an ethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases slightly at higher molecular weights, and hence the comonomer incorporation is said to be "slightly reversed".
Figure 2B:
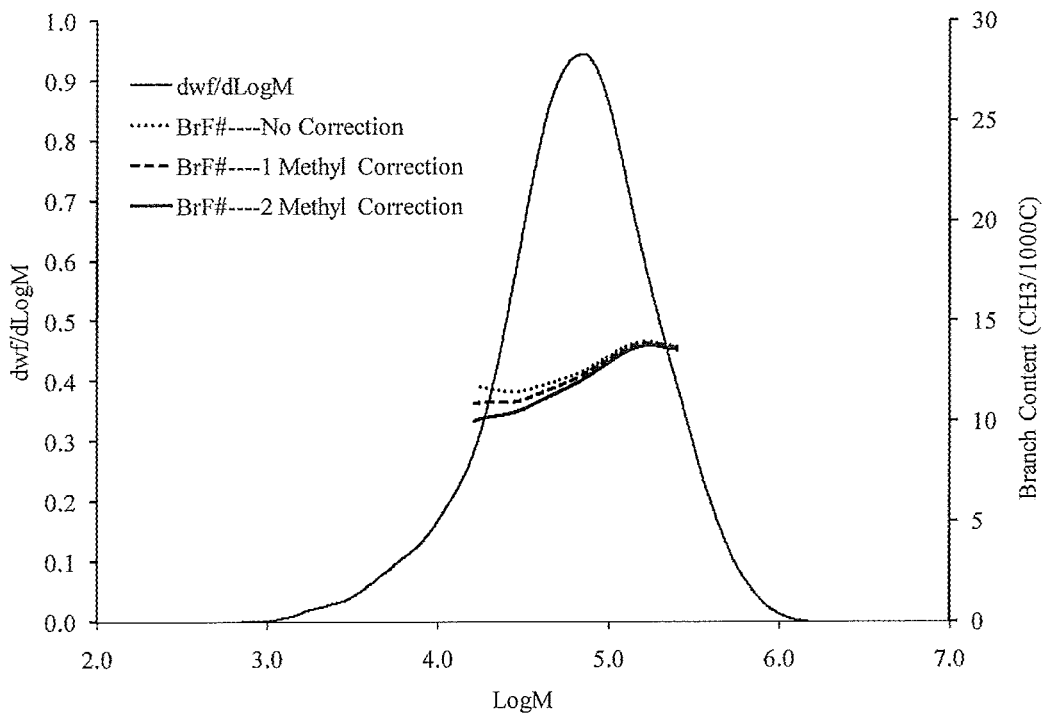
FIG. 2B shows a gel permeation chromatograph with Fourier transform infrared (GPC-FTIR) detection obtained for an ethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".
Figure 2C:
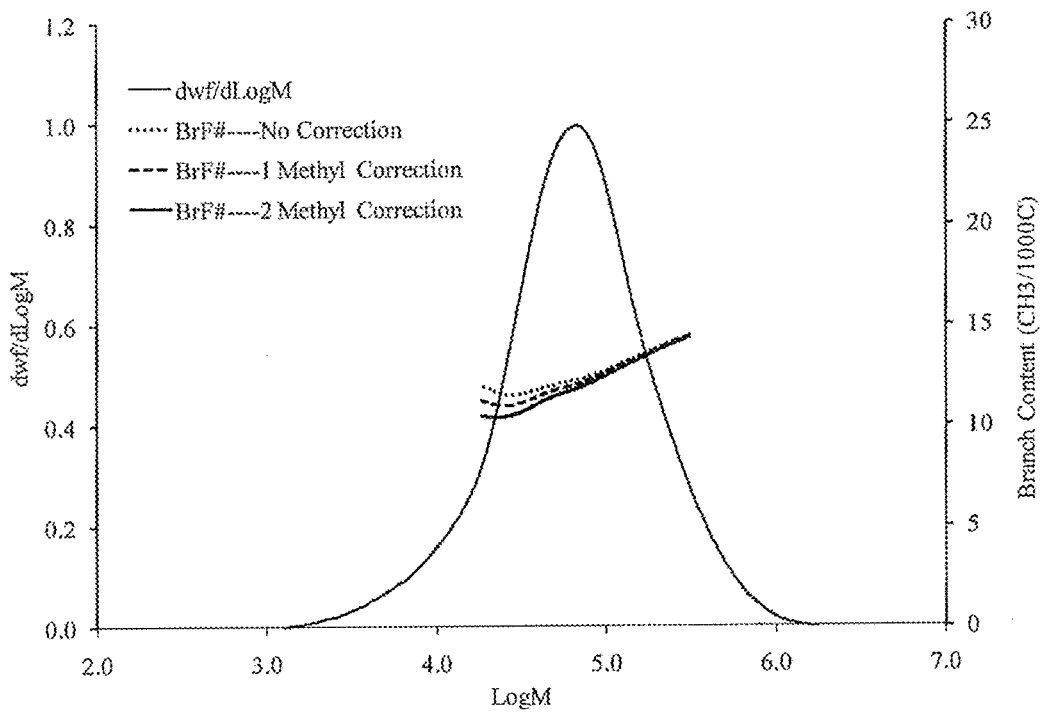
FIG. 2C shows a gel permeation chromatograph with Fourier transform infrared (GPC-FTIR) detection obtained for an ethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".
Figure 2D:
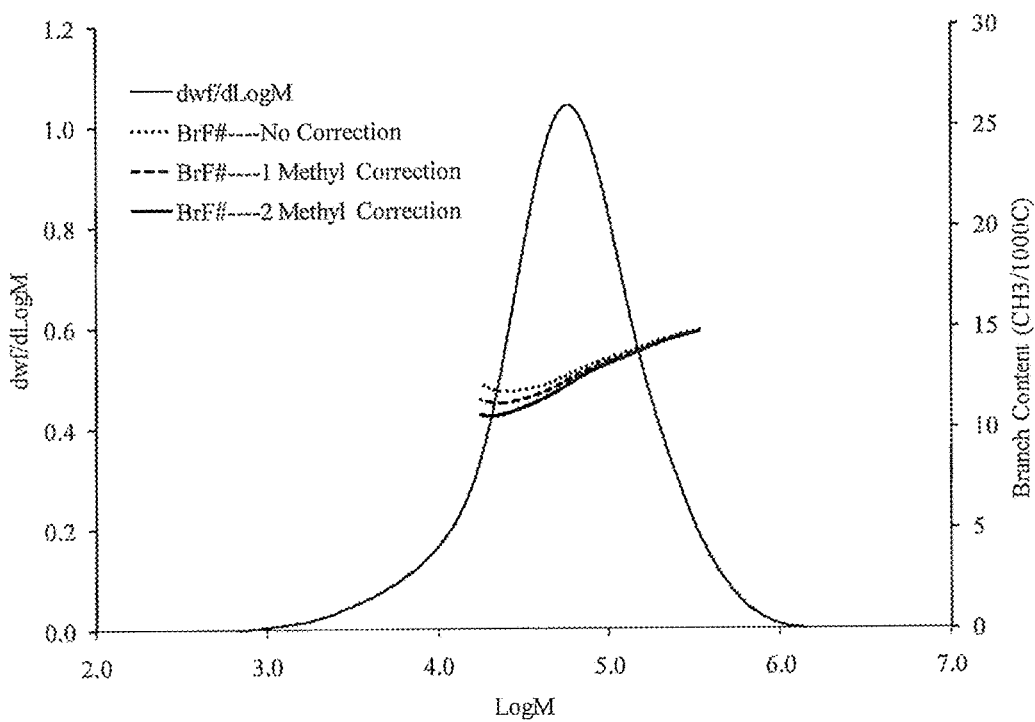
FIG. 2D shows a gel permeation chromatograph with Fourier transform infrared (GPC-FTIR) detection obtained for an ethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".
Figure 2E:
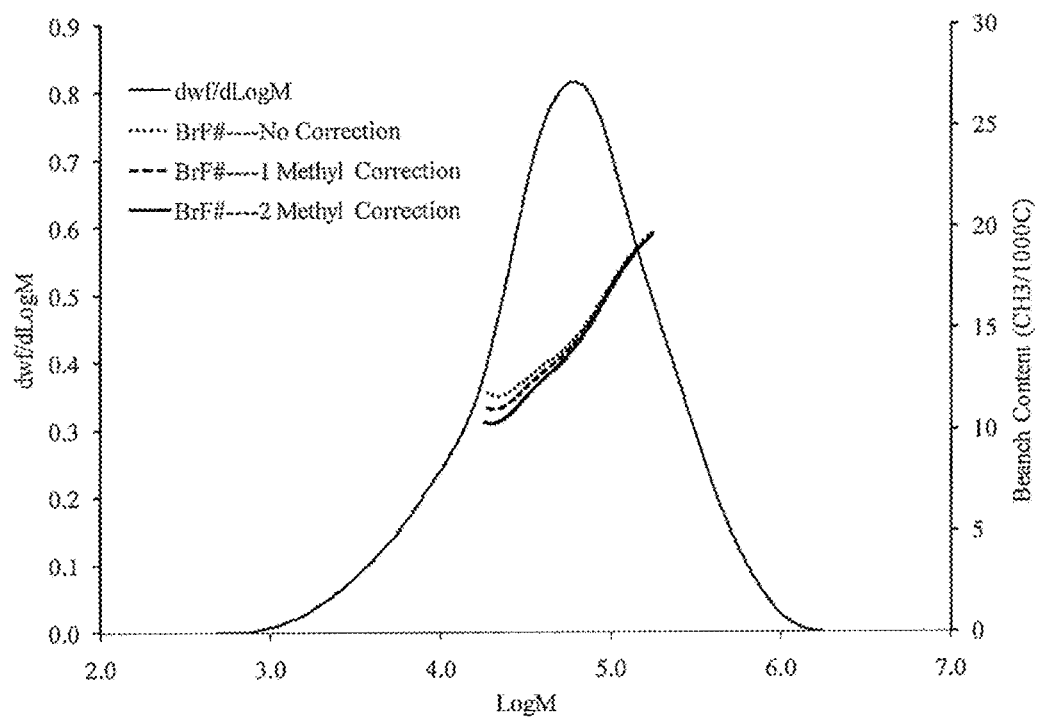
FIG. 2E shows a gel permeation chromatograph with Fourier transform infrared (GPC-FTIR) detection obtained for a comparative ethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".

Each of the ethylene copolymers 2, 3, 4, and comp. ethylene copolymer 5 have a reversed comonomer distribution profile as shown in FIGS. 2B, 2C, 2D and 2E respectively. Interestingly, the ethylene copolymer 1 is only very slightly reversed as shown in FIG. 2A. Comp. ethylene copolymer 5 has a much more reversed comonomer incorporation than ethylene copolymers made using a polymerization catalyst employing a passivated support: Compare FIG. 2E with FIGS. 2A-2D.

Each of the ethylene copolymers 1-4 have a bimodal TREF profile as shown in FIG. 3. Also evident is the fact that the peak elution intensity at T(low), the lower of the two elution peaks, is higher in intensity than the intensity at T(high), the higher of the two elution peaks. In contrast, the TREF profile for comparative ethylene copolymer 5 is broader and more multimodal than strictly bimodal.

A van Gurp-Palmen (VGP) analysis is a means by which to study a polymer architecture (e.g. molecular weight distribution, linearity, etc.) as reflected by the polymer melt morphology. A VGP curve is simply a plot of the phase angle ($\delta$) versus complex modulus (G*), where the two rheology parameters are obtained using the frequency sweep test in dynamic mechanical analysis (DMA). A shift of a VGP curve from a baseline curve or a decrease in the phase angles at the mid-range of complex modulus may indicate changes in the polymer melt morphology.

A VGP plot allows for a determination of the crossover rheology parameter which is defined as the intersecting point obtained between the phase angle ($\delta$) vs. complex modulus (G*) plot and a phase angle ($\delta$) vs. complex viscosity ($\eta$*) plot. Based on a linear viscoelasticity theory, the VGP crossover rheology parameter or "crossover phase angle" ($\delta^{xo}$) occurs at a frequency ($\omega$) which is equal to unity. It is the phase angle at which the G* and the $\eta$* are numerically equivalent. Hence the VGP crossover rheology parameter can be determined in a single DMA test.

Figure 4:
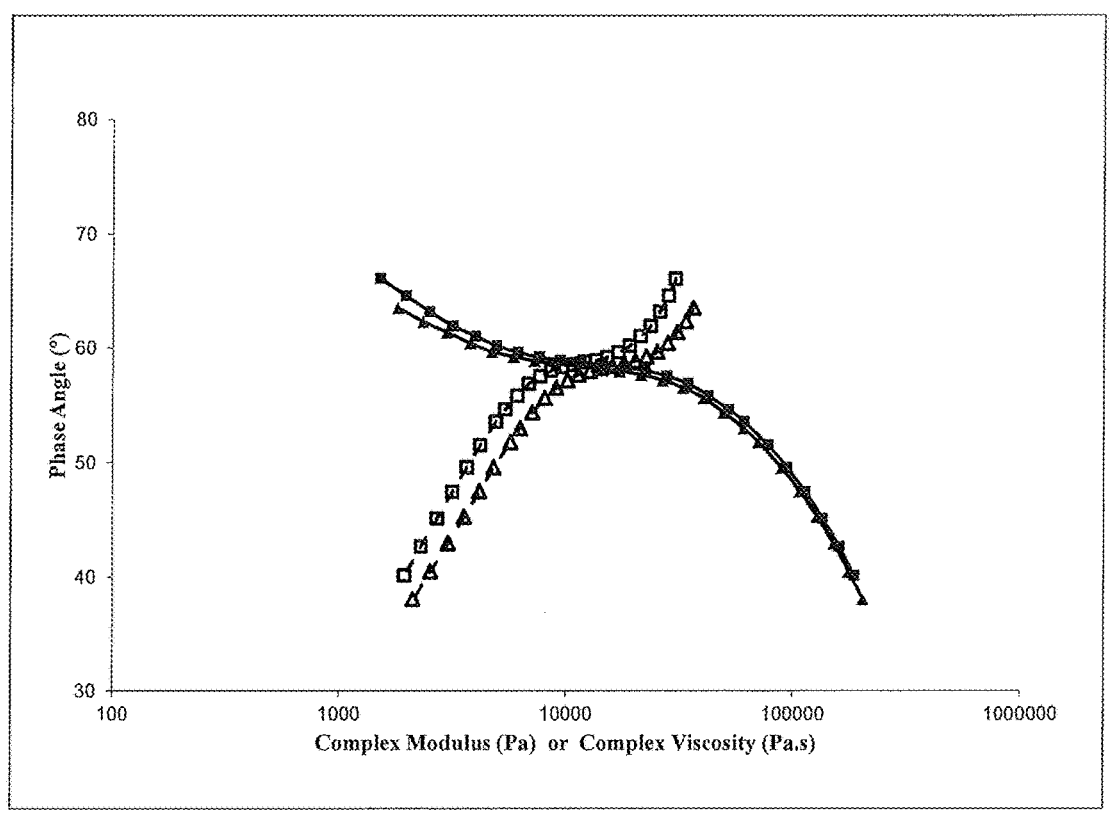
FIG. 4 show plots of the phase angle vs the complex modulus and the phase angle vs complex viscosity for ethylene copolymers made according to the present invention, as determined by dynamic mechanical analysis (DMA).

The VGP crossover plots for ethylene copolymers 1 and 2 are included in FIG. 4. The VGP crossover plots for ethylene copolymer 3 and 4 are included in FIG. 5. The VGP crossover plots for comparative ethylene copolymer 5, is shown in FIG. 6.

VGP crossover points are dependent upon the copolymer architecture. Generally, for resins which are easier to process such as ethylene copolymers 1-4 (but especially 1 and 2) as well as comparative ethylene copolymer 5, the VGP phase angle at which crossover occurs defined as $\delta^{xo}$ is lower than for resins which are more difficult to process. See for example the VGP curves for an Exceed™ 1018 polyethylene resin, which is included as comp. ethylene copolymer 7 in FIG. 6. For the Exceed resin the crossover phase angle $\delta^{xo}$ is greater than 80, while for the ethylene copolymers 1-4, the crossover phase angle ($\delta^{xo}$) falls within the range of from about 58 to about 64. For resins that are easier to process, the shape of the phase angle-complex viscosity curves and the shape of the phase-angle complex modulus curves, are deflected somewhat and more closely resemble mirror images of each other (see FIGS. 4 and 5) relative to the curves obtained for resins which are more difficult to process (again see the curves for an Exceed™ 1018, comp. ethylene copolymer 7, which is included in FIG. 6).

Figure 5:
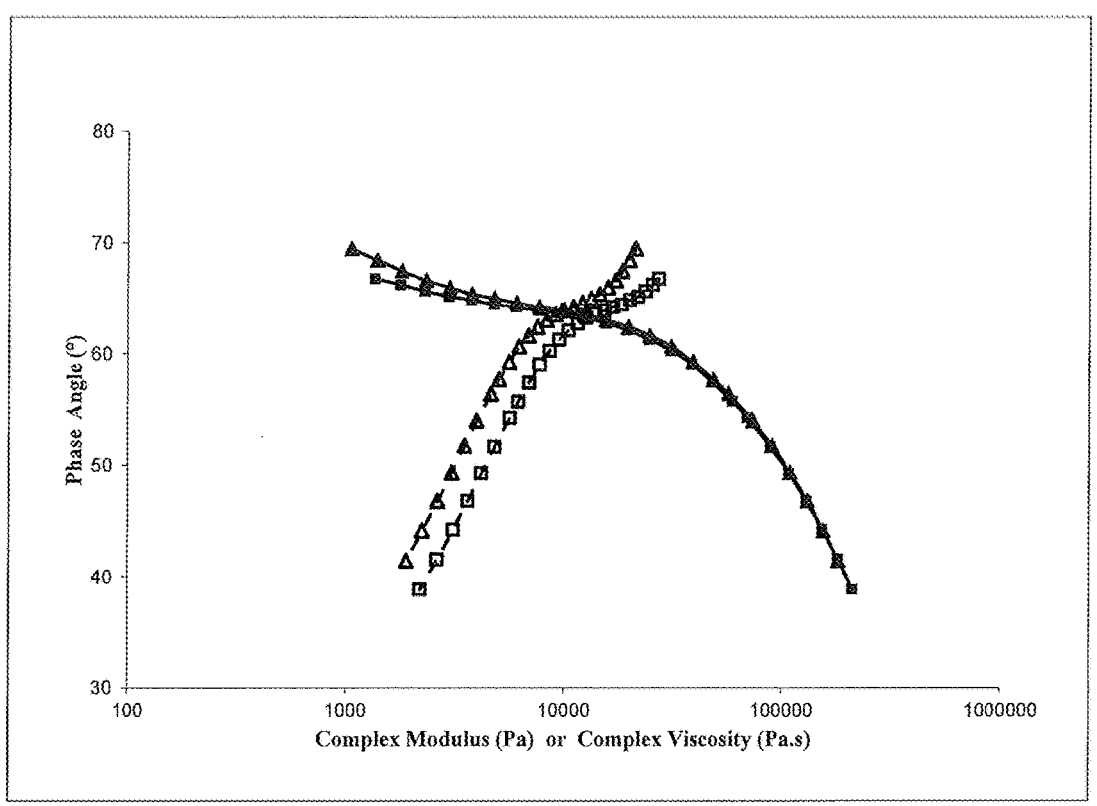
FIG. 5 show plots of the phase angle vs the complex modulus and the phase angle vs complex viscosity for ethylene copolymers made according to the present invention, as determined by dynamic mechanical analysis (DMA).
Figure 6:
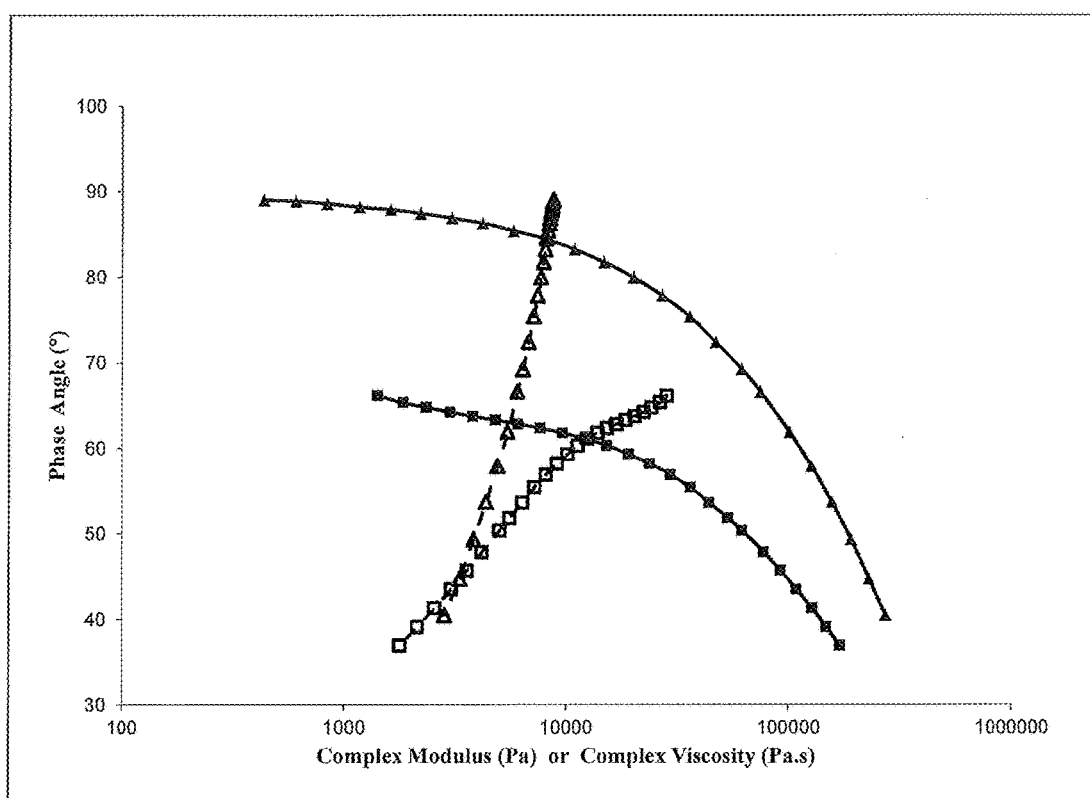
FIG. 6 show plots of the phase angle vs the complex modulus and the phase angle vs complex viscosity for comparative ethylene copolymers, as determined by DMA.
Figure 7:
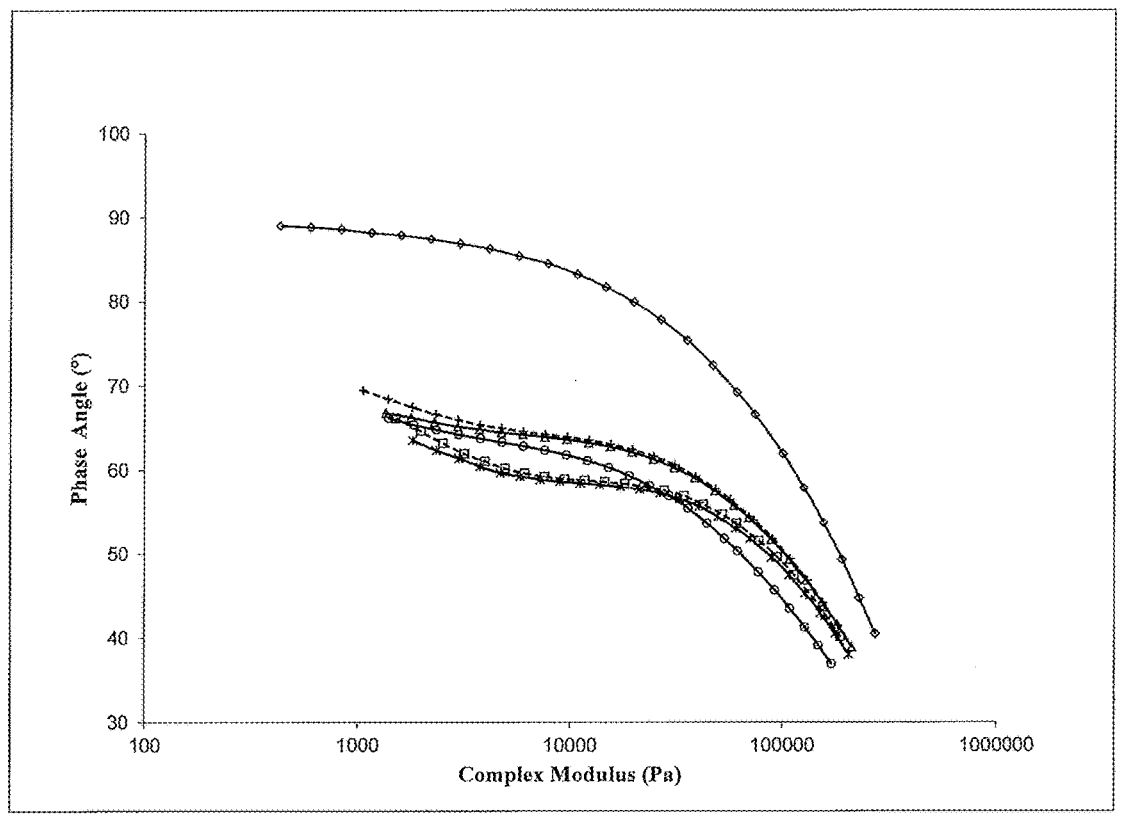
FIG. 7 shows plots of the phase angle vs the complex modulus for ethylene copolymers made according to the present invention and for comparative ethylene copolymers, as determined by dynamic mechanical analysis (DMA).

Interesting, and with reference to FIGS. 4 and 5, ethylene copolymers made using a passivated support having 5 wt % of MgCl$_2$ have even more deflected curves and even lower crossover phase angles, than ethylene copolymers made using a catalyst on a passivated support having 2 wt % of MgCl$_2$. Compare the curves for ethylene copolymers 1 and 2 which have crossover phase angles of 58.8 and 58.2 respectively, with the curves for ethylene copolymers 3 and 4 which have crossover phase angles of 63.2 and 63.9 respectively. This shows that the amount of MgCl$_2$ present in the passivated support can have an influence on the rheological and processing behavior of the resulting ethylene copolymers.

For the purposes of blowing film, a further ethylene copolymer, "ethylene copolymer 1* was prepared analogously to ethylene copolymer 1 using the same catalyst, and was blown into a 1 mil film. Further comparative ethylene copolymers, ethylene copolymers 5* and 6*, which are similar to comparative ethylene copolymers 5 and 6 respectively, were also blown into 1 mil films for comparison purposes. The film data (along with limited polymer data)

for ethylene copolymer 1* and comparative ethylene copolymers 5* and 6* are provided in Table 4.

TABLE 4

Polymer and Film Properties

| | Ethylene Copolymer | | |
|---|---|---|---|
| | 1* | 5*, Comp. | 6*, Comp. |
| Density (g/cm³) | 0.9212 | 0.9224 | 0.9198 |
| Melt Index (g/10 min) | 0.58 | 0.56 | 0.52 |
| Melt Flow Ratio, $I_{21}/I_2$ | 35.5 | 43.0 | 39.6 |
| Polydispersity (Mw/Mn) | 3.84 | 5.94 | 2.74 |
| GPC-FTIR profile | reversed | highly reversed | flat |
| CDBI$_{50}$ (wt %) | 65.0 | 65.1 | 88.0 |
| Dart Impact (g/mil) | 215 | 610 | 212 |
| Dynatup Max. Load (lb) | 5.14 | 5.7 | 5.22 |
| Dynatup Total Energy (ft-lb) | 0.34 | 0.55 | 0.33 |
| Dynatup Energy @ Max. Load (ft-lb) | 0.33 | 0.48 | 0.32 |
| TEF & Lube Puncture (J/mm) | 55 | 59 | 62 |
| ASTM Film Puncture @ Break | | | |
| Maximum Force (lb) | 9.1 | 7.7 | 8.3 |
| Elongation (in.) | 2.9 | 2.5 | 2.9 |
| Total Energy (J/mm) | 70 | 55 | 65 |
| MD Tear (g/mil) | 78 | 73 | 108 |
| TD Tear (g/mil) | 443 | 412 | 416 |
| 1% MD Secant Modulus (MPa) | 213 | 220 | 184 |
| 1% TD Secant Modulus (MPa) | 244 | 273 | 205 |
| MD Tensile Strength (MPa) | 50.8 | 42.4 | 43.4 |
| TD Tensile Strength (MPa) | 45.9 | 45.7 | 39.7 |
| MD Ultimate Elongation (%) | 535 | 506 | 490 |
| TD Ultimate Elongation (%) | 698 | 706 | 679 |
| MD Yield Strength (MPa) | 11.4 | 10.9 | 10.2 |
| TD Yield Strength (MPa) | 11.5 | 11.9 | 10.5 |
| MD Elongation at Yield (%) | 14 | 13 | 14 |
| TD Elongation at Yield (%) | 15 | 14 | 17 |
| Haze (%) | 10.2 | 17.4 | 9.5 |
| Gloss at 45° | 46 | 30 | 46 |
| Seal Initiation Temperature (° C.) | 112/115 | 116/118 | 111/113 |
| Maximum Force (N) | 31.1 | 31.0 | 31.9 |
| Temperature at Max. Force (° C.) | 160 | 160 | 140 |
| Film Processing Parameters: | | | |
| Melt Temp (° F.) | 433 | 432 | 435 |
| Extruder Pressure (psi) | 4040-4085 | 3715-3750 | 3875-3910 |
| Current (amp) | 38 | 37 | 40 |
| Voltage (V) | 206 | 207 | 190 |
| spec. output (lb/hr/rpm) | 2.27 | 2.44 | 2.50 |
| Specific Power (lb/hr/amp) | 2.63 | 2.70 | 2.50 |
| Specific energy (w/lb/hr) | 78.3 | 76.6 | 76.0 |
| PPA additive (ppm) | 1500 | 1500 | 250 ppm of fluoroelastomer |

As can be seen from Table 4, when blown into film ethylene copolymer 1* (prepared from a phosphinimine catalyst immobilized on a passivated support) has improved film puncture properties (maximum force, elongation and energy) relative to film made from comparative ethylene copolymer 5* (prepared from a phosphinimine catalyst on a non-passivated support). Ethylene copolymer 1* also gives a film which has slightly better or comparable film puncture properties when compared to film made from copolymer 6*, an Enable™ 20-05 grade.

Ethylene copolymer 1* provides improved films compared to ethylene copolymer 6* with regard to modulus, tensile strength and elongation in both machine (MD) and transverse (TD) directions. Ethylene copolymer 1* also shows MD tensile properties better than ethylene copolymer 5*. Further, film made from ethylene copolymer 1* has improved optical properties relative to film made from ethylene copolymer 5*. For example, the haze value is 10.2% vs 17.4%, and the gloss at 45° value is 46 vs 30.

Embodiments of the invention may include one or more of the following embodiments A-S in any combination. For clarity, any one or more of the following embodiments may be combined with any one or more of the following embodiments.

Embodiment A

An olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm³ to 0.936 g/cm³, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index CDBI$_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride.

Embodiment B

An olefin polymerization process to produce an ethylene copolymer, wherein the ethylene copolymer has a CDBI$_{50}$ of from 50% to 75 wt %.

Embodiment C

An olefin polymerization process to produce an ethylene copolymer, wherein the ethylene copolymer has a molecular weight distribution ($M_w/M_n$) of from 2.6 to 4.6.

Embodiment D

An olefin polymerization process to produce an ethylene copolymer, wherein the ethylene copolymer has a melt flow ratio ($I_{21}/I_2$) of from 24 to 40.

Embodiment E

An olefin polymerization process to produce an ethylene copolymer, wherein the ethylene copolymer has a bimodal TREF profile.

Embodiment F

An olefin polymerization process to produce an ethylene copolymer, wherein the ethylene copolymer has a z-average molecular weight distribution ($M_z/M_w$) of from 1.75 to 3.0.

Embodiment G

An olefin polymerization process to produce an ethylene copolymer, the process comprising contacting ethylene and at least one alpha olefin having from 3-8 carbon atoms with a polymerization catalyst in a gas phase reactor, wherein the alpha-olefin is 1-hexene.

Embodiment H

An olefin polymerization process to produce an ethylene copolymer, wherein the ethylene copolymer has a bimodal TREF profile comprising two intensity maxima occurring at elution temperatures T(low) and T(high); wherein T(low) occurs at from 75° C. to 90° C. and T(high) occurs at from 90° C. to 98° C., provided that T(low) is lower than T(high).

Embodiment I

An olefin polymerization process to produce an ethylene copolymer, wherein the ethylene copolymer has a bimodal TREF profile defined by two elution intensity maxima occurring at elution temperatures T(low) and T(high); wherein T(low) occurs at from 75° C. to 89° C., T(high) occurs at from 90° C. to 98° C., and wherein T(high)−T(low) is from 3° C. to 15° C.

Embodiment J

An olefin polymerization process to produce an ethylene copolymer, wherein the ethylene copolymer has a bulk density of 26 lb/ft$^3$ or greater.

Embodiment K

An olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index $CDBI_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; wherein the passivated support is prepared in a non-polar hydrocarbon solvent or diluent.

Embodiment L

An olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index $CDBI_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; wherein the polymerization catalyst system further comprises a catalyst modifier.

Embodiment M

An olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index $CDBI_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; wherein the phosphinimine catalyst has the formula: $(1\text{-}R^\yen\text{-Indenyl})((t\text{-Bu})_3P\!=\!N)TiX_2$, where $R^\yen$ is an alkyl group, an aryl group or a benzyl group and wherein each of the alkyl group, the aryl group, and the benzyl group is unsubstituted or is substituted by at least one fluoride atom; and X is an activatable ligand.

Embodiment N

An olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index $CDBI_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; wherein the phosphinimine catalyst has the formula: $(1\text{-}R^\yen\text{-Indenyl})((t\text{-Bu})_3P\!=\!N)TiX_2$, where $R^\yen$ is a benzyl group substituted by at least one fluoride atom; and X is an activatable ligand.

Embodiment O

An olefin polymerization process to produce an ethylene copolymer, the process comprising contacting ethylene and at least one alpha olefin having from 3-8 carbon atoms with a polymerization catalyst in a gas phase reactor; wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index CDBI$_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; wherein the phosphinimine catalyst has the formula: (1-C$_6$F$_5$CH$_2$-Indenyl)((t-Bu)$_3$P=N)TiX$_2$, where X is an activatable ligand.

Embodiment P

An olefin polymerization process to produce an ethylene copolymer, the process comprising contacting ethylene and at least one alpha olefin having from 3-8 carbon atoms with a polymerization catalyst in a single gas phase reactor; the ethylene copolymer having a density of from 0.916 g/cm$^3$ to 0.936 g/cm$^3$, and a melt flow ratio ($I_{21}/I_2$) of greater than 22 but less than 42; wherein the polymerization catalyst comprises a phosphinimine catalyst, a passivated support, and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; and wherein the phosphinimine catalyst has the formula: (1-R$^¥$-Indenyl)((t-Bu)$_3$P=N)TiX$_2$, where R$^¥$ is an alkyl group, an aryl group or a benzyl group and wherein each of the alkyl group, the aryl group, and the benzyl group is unsubstituted or is substituted by at least one fluoride atom; and X is an activatable ligand.

Embodiment Q

An ethylene copolymer having a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 40, a molecular weight distribution ($M_w/M_n$) of from 2.5 to 4.5, a z-average molecular weight distribution ($M_z/M_w$) of less than 3.0, a reverse comonomer distribution profile as determined by GPC-FTIR, and a composition distribution breadth index CDBI$_{50}$ of from 50 wt % to 80 wt % as determined by TREF, and a bimodal TREF profile; wherein the ethylene copolymer is made in a single gas phase reactor using a polymerization catalyst comprising: a phosphinimine catalyst, a passivated support and a co-catalyst; wherein the passivated support comprises silica which has been treated with i) an organoaluminum compound and ii) magnesium chloride; and wherein the magnesium chloride is generated by addition of a diorganomagnesium compound and a source of chloride to the organoaluminum treated silica, provided that the source of chloride is not a transition metal chloride.

Embodiment R

A film layer comprising an ethylene copolymer having a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 40, a molecular weight distribution ($M_w/M_n$) of from 2.5 to 4.5, a z-average molecular weight distribution ($M_z/M_w$) of less than 3.0, a reverse comonomer distribution profile as determined by GPC-FTIR, and a composition distribution breadth index CDBI$_{50}$ of from 50 wt % to 80 wt % as determined by TREF, and a bimodal TREF profile; wherein the ethylene copolymer is made in a single gas phase reactor using a polymerization catalyst comprising: a phosphinimine catalyst, a passivated support and a co-catalyst; wherein the passivated support comprises silica which has been treated with i) an organoaluminum compound and ii) magnesium chloride; and wherein the magnesium chloride is generated by addition of a diorganomagnesium compound and a source of chloride to the organoaluminum treated silica, provided that the source of chloride is not a transition metal chloride.

Embodiment S

A film layer having a haze of less than 15% at 1 mil thickness, and a gloss at 45° of at least 35 at 1 mil thickness.

INDUSTRIAL APPLICABILITY

Supported, single site polymerization catalysts are employed to make commercially relevant polyolefin materials which find use in numerous applications, such as, for example, in film packaging applications. The present invention provides an olefin polymerization process employing a single site polymerization catalyst immobilized on a passivated support. Polymerization products and films are also provided. The passivated support is formed by adding an organoaluminum compound, and then magnesium chloride to, for example, silica, a material widely used as a support for olefin polymerization catalysts in industrial scale polymerization processes.

The invention claimed is:

1. An olefin polymerization process to produce an ethylene copolymer, the process comprising contacting ethylene and at least one alpha olefin having from 3-8 carbon atoms with a polymerization catalyst in a gas phase reactor;
   wherein the ethylene copolymer has a density of from 0.916 g/cm$^3$ to 0.936 g/cm$^3$, a melt index ($I_2$) of from 0.1 g/10 min to 2.0 g/10 min, a melt flow ratio ($I_{21}/I_2$) of greater than 22 but less than 42, a molecular weight distribution ($M_w/M_n$) of from 2.3 to 5.0, a reverse comonomer distribution profile as determined by GPC-FTIR, and a composition distribution breadth index CDBI$_{50}$ of from 45 wt % to 80 wt % as determined by TREF; the polymerization catalyst comprises a phosphinimine catalyst, a passivated support and a co-catalyst; and the passivated support comprises silica which has been treated with i) an organoaluminum compound and ii) magnesium chloride;
   wherein the magnesium chloride is generated by addition of a diorganomagnesium compound and a source of chloride to the organoaluminum treated silica, provided that the source of chloride is not a transition metal chloride.

2. The process of claim 1 wherein the ethylene copolymer has a CDBI$_{50}$ of from 50% to 75 wt %.

3. The process of claim 1 wherein the ethylene copolymer has a molecular weight distribution ($M_w/M_n$) of from 2.6 to 4.6.

4. The process of claim 1 wherein the ethylene copolymer has a melt flow ratio ($I_{21}/I_2$) of from 24 to 40.

5. The process of claim 1 wherein the ethylene copolymer has a bimodal TREF profile.

6. The process of claim 1 wherein the ethylene copolymer has a z-average molecular weight distribution ($M_z/M_w$) of from 1.75 to 3.0.

7. The process of claim 1 wherein the alpha-olefin is 1-hexene.

8. The process of claim 1 wherein the ethylene copolymer has a bimodal TREF profile comprising two intensity maxima occurring at elution temperatures T(low) and T(high); wherein T(low) occurs at from 75° C. to 90° C. and T(high) occurs at from 90° C. to 98° C., provided that T(low) is lower than T(high).

9. The process of claim 1 wherein the ethylene copolymer has a bimodal TREF profile defined by two elution intensity maxima occurring at elution temperatures T(low) and T(high); wherein T(low) occurs at from 75° C. to 89° C., T(high) occurs at from 90° C. to 98° C., and wherein T(high)-T(low) is from 3° C. to 15° C.

10. The process of claim 1 wherein the ethylene copolymer has a bulk density of 26 lb/ft³ or greater.

11. The process of claim 1 wherein the passivated support is prepared in a non-polar hydrocarbon solvent or diluent.

12. The process of claim 1 wherein the polymerization catalyst system further comprises a catalyst modifier.

13. The process of claim 1 wherein the phosphinimine catalyst has the formula: $(1\text{-}R^\yen\text{-Indenyl})((t\text{-Bu})_3P\!=\!N)TiX_2$, where $R^\yen$ is an alkyl group, an aryl group or a benzyl group and wherein each of the alkyl group, the aryl group, and the benzyl group is unsubstituted or is substituted by at least one fluoride atom; and X is an activatable ligand.

14. The process of claim 13 wherein the phosphinimine catalyst has the formula: $(1\text{-}R^\yen\text{-Indenyl})((t\text{-Bu})_3P\!=\!N)TiX_2$, where $R^\yen$ is a benzyl group substituted by at least one fluoride atom; and X is an activatable ligand.

15. The process of claim 14 wherein the phosphinimine catalyst has the formula: $(1\text{-}C_6F_5CH_2\text{-Indenyl})((t\text{-Bu})_3P\!=\!N)TiX_2$, where X is an activatable ligand.

16. An olefin polymerization process to produce an ethylene copolymer, the process comprising contacting ethylene and at least one alpha olefin having from 3-8 carbon atoms with a polymerization catalyst in a single gas phase reactor; the ethylene copolymer having a density of from 0.916 g/cm³ to 0.936 g/cm³, and a melt flow ratio ($I_{21}/I_2$) of greater than 22 but less than 42; wherein the polymerization catalyst comprises a phosphinimine catalyst, a passivated support, and a co-catalyst; and the passivated support comprises silica which has been treated with i) an organoaluminum compound and ii) magnesium chloride; wherein the magnesium chloride is generated by addition of a diorganomagnesium compound and a source of chloride to the organoaluminum treated silica, provided that the source of chloride is not a transition metal chloride; and wherein the phosphinimine catalyst has the formula: $(1\text{-}R^\yen\text{-Indenyl})((t\text{-Bu})_3P\!=\!N)TiX_2$, where $R^\yen$ is an alkyl group, an aryl group or a benzyl group and wherein each of the alkyl group, the aryl group, and the benzyl group is unsubstituted or is substituted by at least one fluoride atom; and X is an activatable ligand.

17. An ethylene copolymer having a density of from 0.916 g/cm³ to 0.936 g/cm³, a melt index ($I_2$) of from 0.1 g/10 min to 2.0 g/10 min, a melt flow ratio ($I_{21}/I_2$) of greater than 22 but less than 40, a molecular weight distribution ($M_w/M_n$) of from 2.5 to 4.5, a z-average molecular weight distribution ($M_z/M_w$) of less than 3.0, a reverse comonomer distribution profile as determined by GPC-FTIR, and a composition distribution breadth index $CDBI_{50}$ of from 50 wt % to 80 wt % as determined by TREF, and a bimodal TREF profile; wherein the ethylene copolymer is made in a single gas phase reactor using a polymerization catalyst comprising: a phosphinimine catalyst, a passivated support and a co-catalyst; wherein the passivated support comprises silica which has been treated with i) an organoaluminum compound and ii) magnesium chloride; and wherein the magnesium chloride is generated by addition of a diorganomagnesium compound and a source of chloride to the organoaluminum treated silica, provided that the source of chloride is not a transition metal chloride.

18. A film layer comprising an ethylene copolymer having a density of from 0.916 g/cm³ to 0.936 g/cm³, a melt index ($I_2$) of from 0.1 g/10 min to 2.0 g/10 min, a melt flow ratio ($I_{21}/I_2$) of greater than 22 but less than 40, a molecular weight distribution ($M_w/M_n$) of from 2.5 to 4.5, a z-average molecular weight distribution ($M_z/M_w$) of less than 3.0, a reverse comonomer distribution profile as determined by GPC-FTIR, and a composition distribution breadth index $CDBI_{50}$ of from 50 wt % to 80 wt % as determined by TREF, and a bimodal TREF profile; wherein the ethylene copolymer is made in a single gas phase reactor using a polymerization catalyst comprising: a phosphinimine catalyst, a passivated support and a co-catalyst; wherein the passivated support comprises silica which has been treated with i) an organoaluminum compound and ii) magnesium chloride; and wherein the magnesium chloride is generated by addition of a diorganomagnesium compound and a source of chloride to the organoaluminum treated silica, provided that the source of chloride is not a transition metal chloride.

19. The film layer of claim 18, having a haze of less than 15% at 1 mil thickness, and a gloss at 45° of at least 35 at 1 mil thickness.

* * * * *